(12) United States Patent
Ghiassi et al.

(10) Patent No.: US 12,440,200 B2
(45) Date of Patent: Oct. 14, 2025

(54) STABILIZING RETRACTOR SYSTEM

(71) Applicant: RetractOrtho, Inc., Solana Beach, CA (US)

(72) Inventors: Alidad Ghiassi, Los Angeles, CA (US); Steven Howard, La Jolla, CA (US); Bradley Klos, Solana Beach, CA (US); Michael Bauschard, Richmond, VA (US)

(73) Assignee: RetractOrtho, Inc., Solana Beach, CA (US)

( * ) Notice: Subject to any disclaimer, the term of this patent is extended or adjusted under 35 U.S.C. 154(b) by 78 days.

(21) Appl. No.: 18/412,204

(22) Filed: Jan. 12, 2024

(65) Prior Publication Data

US 2024/0148372 A1    May 9, 2024

Related U.S. Application Data

(63) Continuation-in-part of application No. 18/483,277, filed on Oct. 9, 2023, now abandoned, which is a continuation of application No. 17/368,623, filed on Jul. 6, 2021, now Pat. No. 11,779,323.

(60) Provisional application No. 63/438,742, filed on Jan. 12, 2023, provisional application No. 63/050,633, filed on Jul. 10, 2020.

(51) Int. Cl.
| | |
|---|---|
| *A61B 17/02* | (2006.01) |
| *A61B 17/17* | (2006.01) |
| *A61B 17/88* | (2006.01) |
| *A61B 17/00* | (2006.01) |

(52) U.S. Cl.
CPC ........ *A61B 17/025* (2013.01); *A61B 17/1782* (2016.11); *A61B 17/8897* (2013.01); *A61B 2017/00862* (2013.01); *A61B 2017/0092* (2013.01)

(58) Field of Classification Search
CPC .................................................... A61B 17/025
See application file for complete search history.

(56) References Cited

U.S. PATENT DOCUMENTS

| | | | | |
|---|---|---|---|---|
| 3,731,673 | A | * | 5/1973 | Halloran ................ A61B 17/02 606/86 R |
| 3,750,652 | A | * | 8/1973 | Sherwin ............... A61B 17/025 600/219 |
| 3,766,910 | A | | 10/1973 | Lake |
| 4,548,199 | A | | 10/1985 | Agee |

(Continued)

FOREIGN PATENT DOCUMENTS

| | | |
|---|---|---|
| CN | 206434403 | 8/2017 |
| CN | 207125751 | 3/2018 |
| EP | 0731669 | 9/1996 |

*Primary Examiner* — Christian A Sevilla
(74) *Attorney, Agent, or Firm* — Knobbe Martens Olson & Bear LLP

(57) ABSTRACT

A soft tissue retraction system may include a support body. A soft tissue retraction system may include a bone engaging concavity on a first side of the support body. A soft tissue retraction system may include a soft tissue retracting surface on a second side of the support body. The system may include a first guide configured to receive a first pin to anchor the first pin into a bone when the bone is positioned within the bone engaging concavity. The system may include a second guide configured to receive a second pin to anchor the second pin into the bone when the bone is positioned within the bone engaging concavity.

16 Claims, 30 Drawing Sheets

(56) References Cited

U.S. PATENT DOCUMENTS

| | | | |
|---|---|---|---|
| 4,938,230 A | 7/1990 | Machek et al. | |
| 5,334,194 A | 8/1994 | Mikhail | |
| 5,512,038 A | 4/1996 | O'Neal et al. | |
| 5,520,608 A | 5/1996 | Cabrera et al. | |
| 6,190,312 B1 | 2/2001 | Fowler, Jr. | |
| 6,409,731 B1 * | 6/2002 | Masson | A61B 17/02 606/86 R |
| 7,195,593 B1 * | 3/2007 | Masson | A61B 17/025 600/210 |
| 8,905,923 B2 | 12/2014 | Carlson | |
| 9,414,827 B2 | 8/2016 | Salomon | |
| 11,534,152 B2 | 12/2022 | Ghiassi et al. | |
| 11,583,268 B2 | 2/2023 | Ghiassi et al. | |
| 11,779,323 B2 | 10/2023 | Ghiassi et al. | |
| 2005/0080320 A1 | 4/2005 | Lee et al. | |
| 2005/0085723 A1 | 4/2005 | Huebner | |
| 2006/0019216 A1 | 1/2006 | Priluck et al. | |
| 2008/0021286 A1 | 1/2008 | Risto et al. | |
| 2011/0054262 A1 * | 3/2011 | Cobb | A61B 17/02 600/210 |
| 2012/0283519 A1 | 11/2012 | Nguyen et al. | |
| 2017/0202672 A1 | 7/2017 | Persaud | |
| 2018/0338807 A1 | 11/2018 | Kim et al. | |
| 2019/0374214 A1 | 12/2019 | Bohl et al. | |
| 2020/0253595 A1 | 8/2020 | McBride, Jr. et al. | |
| 2022/0008054 A1 | 1/2022 | Ghiassi et al. | |
| 2022/0183672 A1 | 6/2022 | Ghiassi et al. | |
| 2022/0257228 A1 | 8/2022 | Ghiassi et al. | |

\* cited by examiner

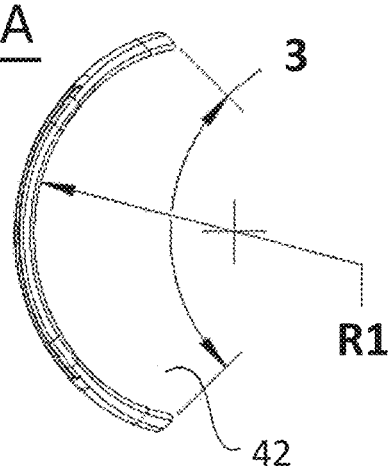
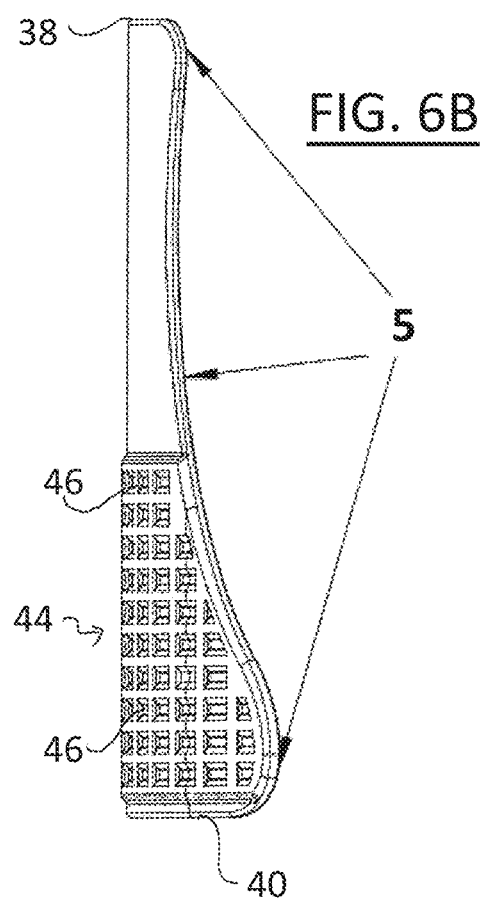
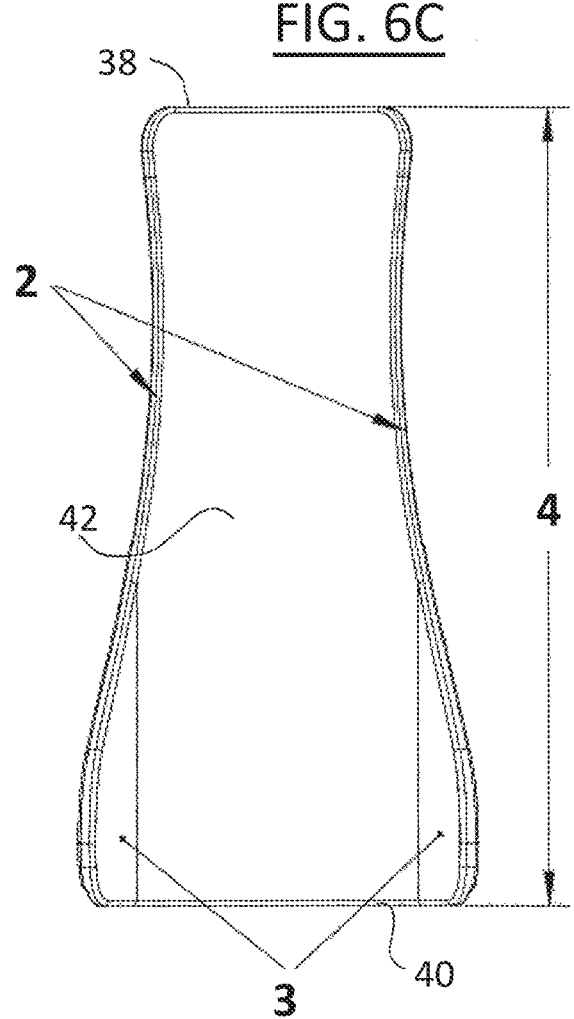

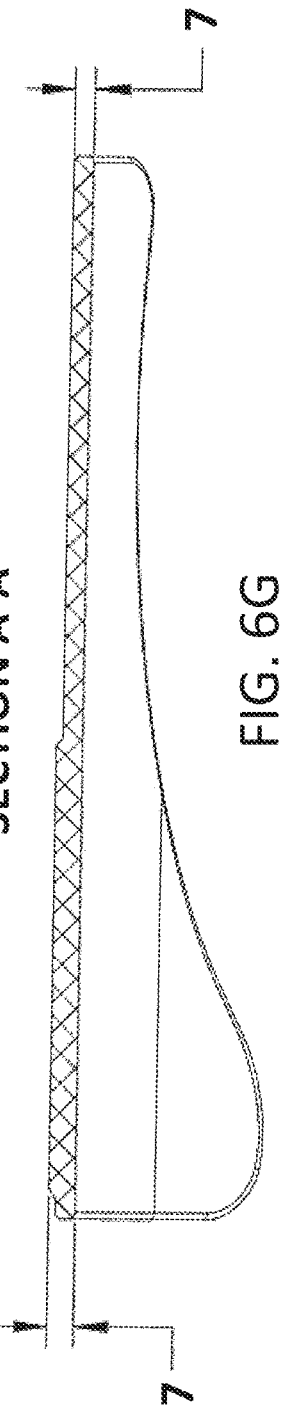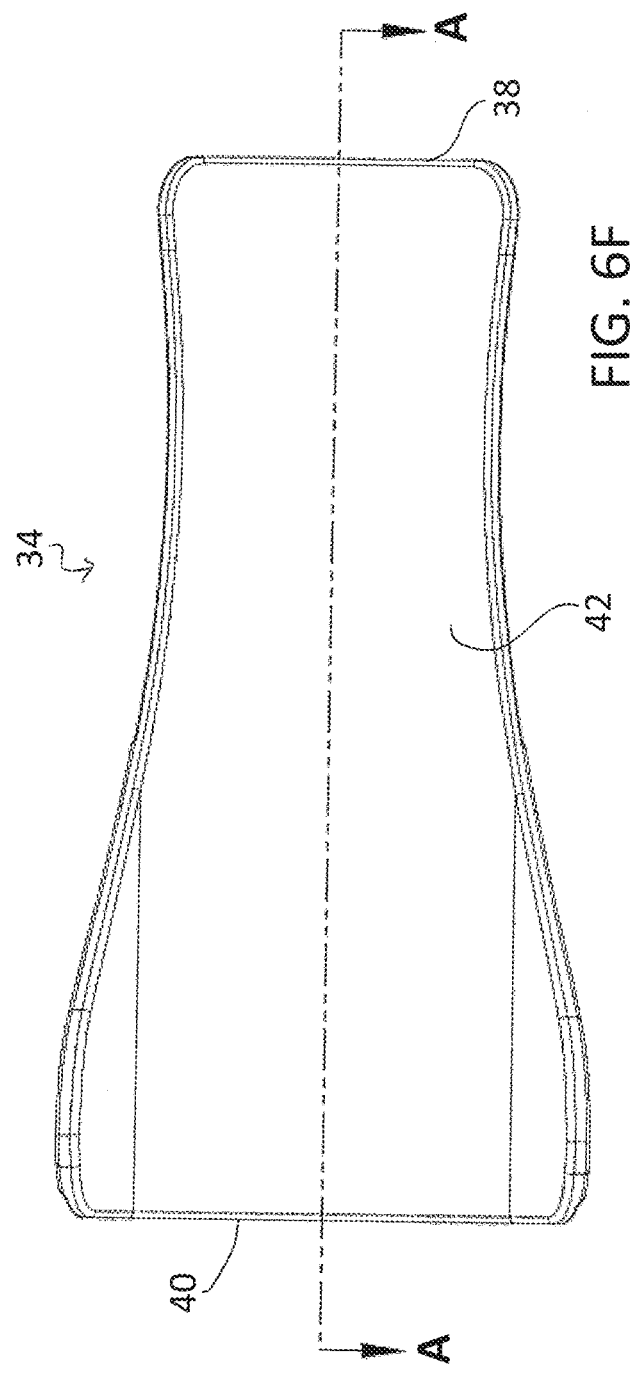

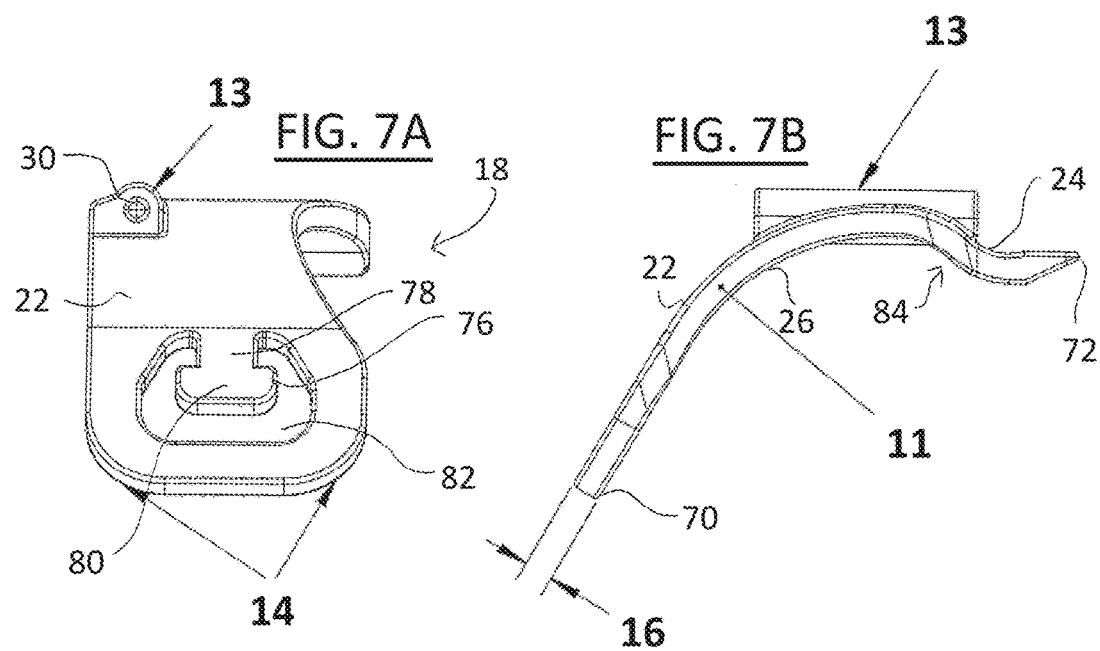
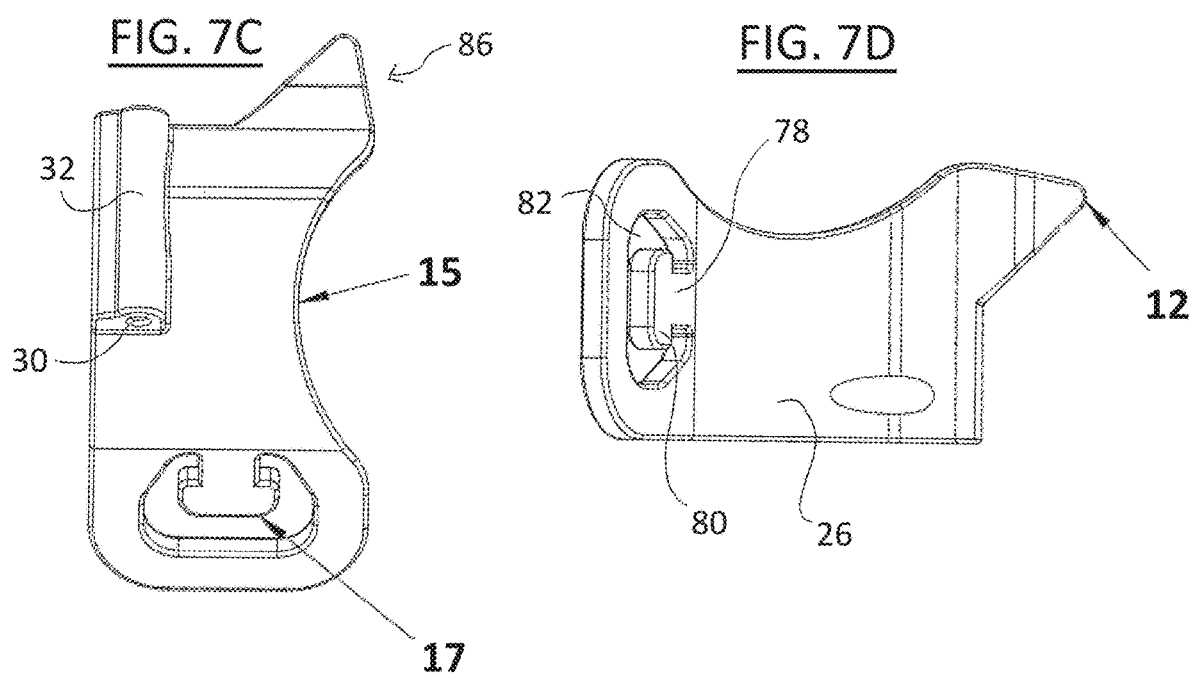

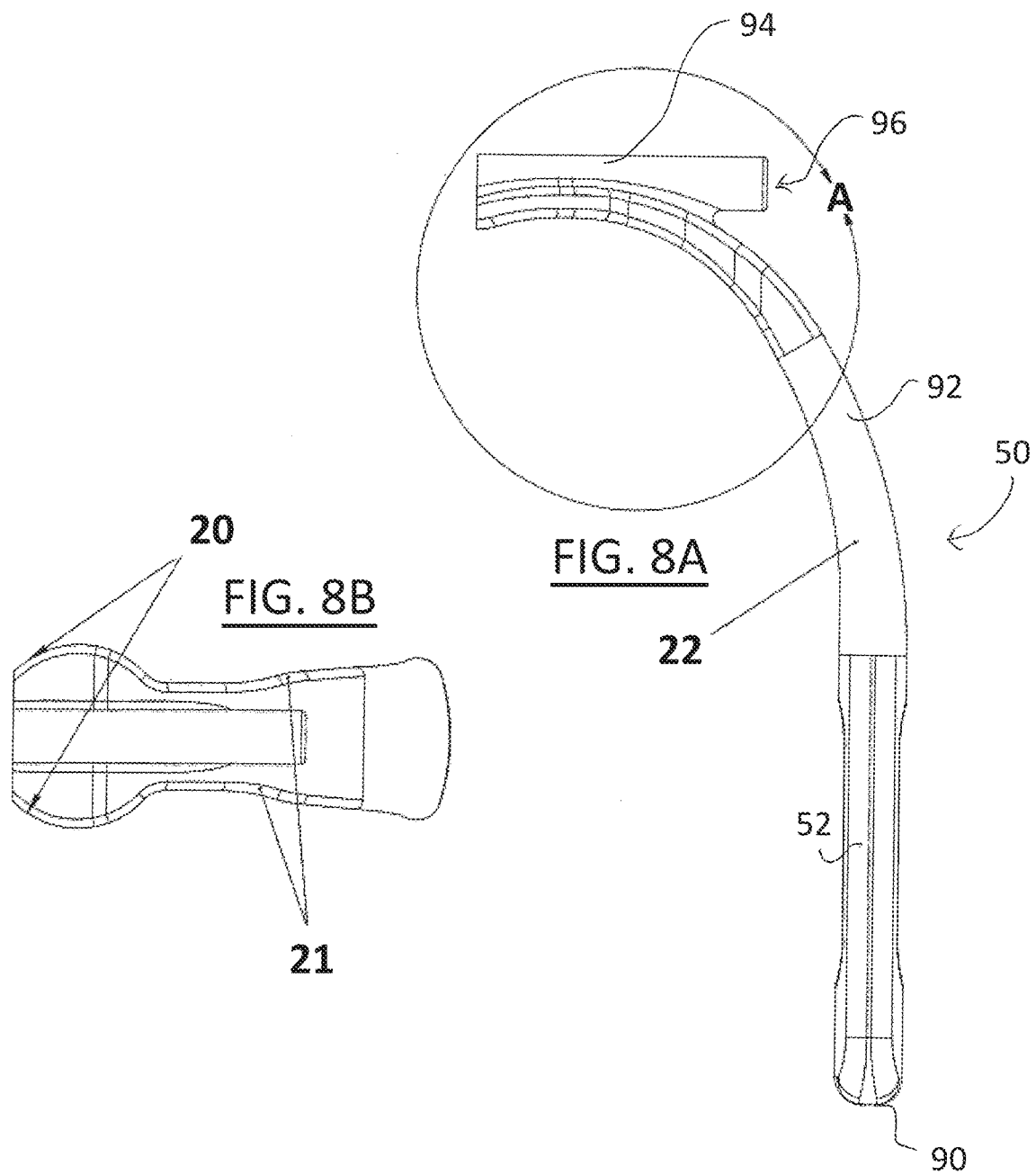

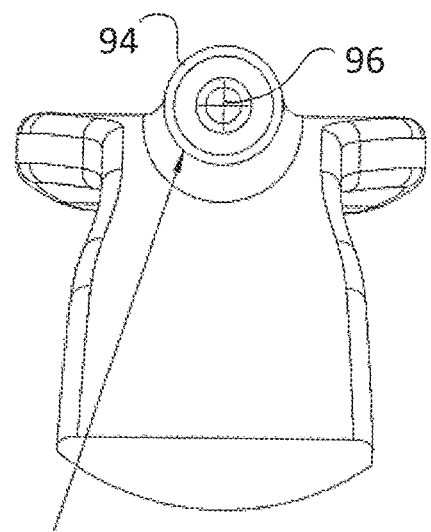
FIG. 9C
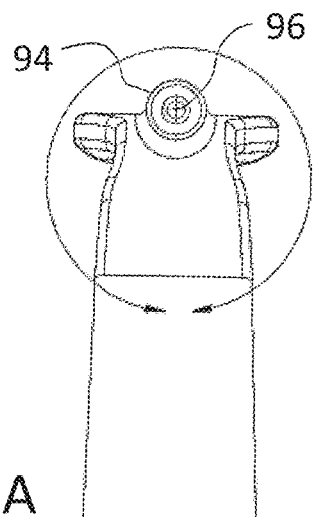
FIG. 9A
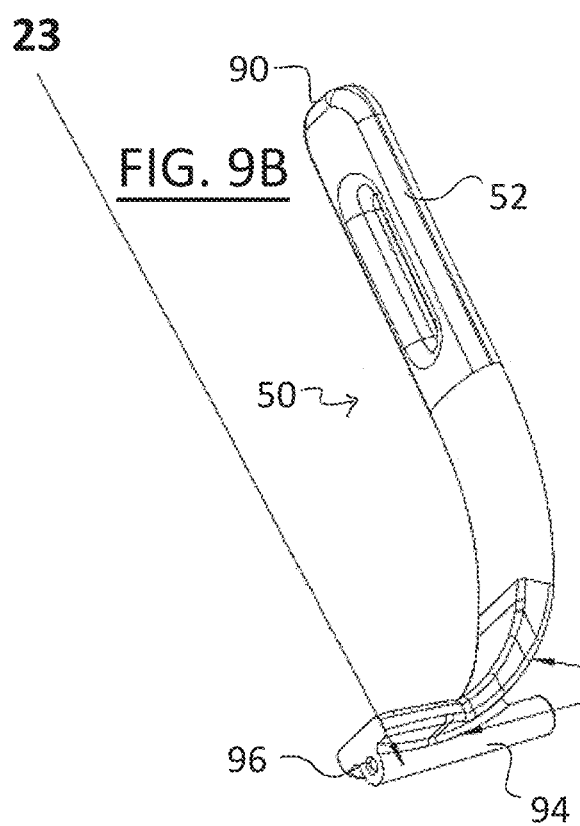
FIG. 9B
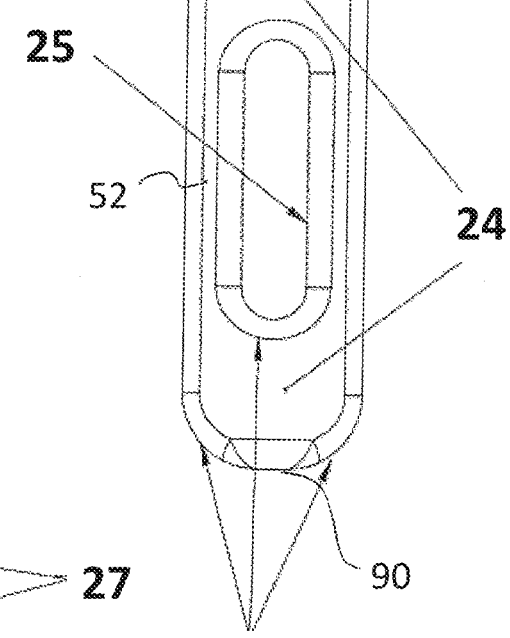

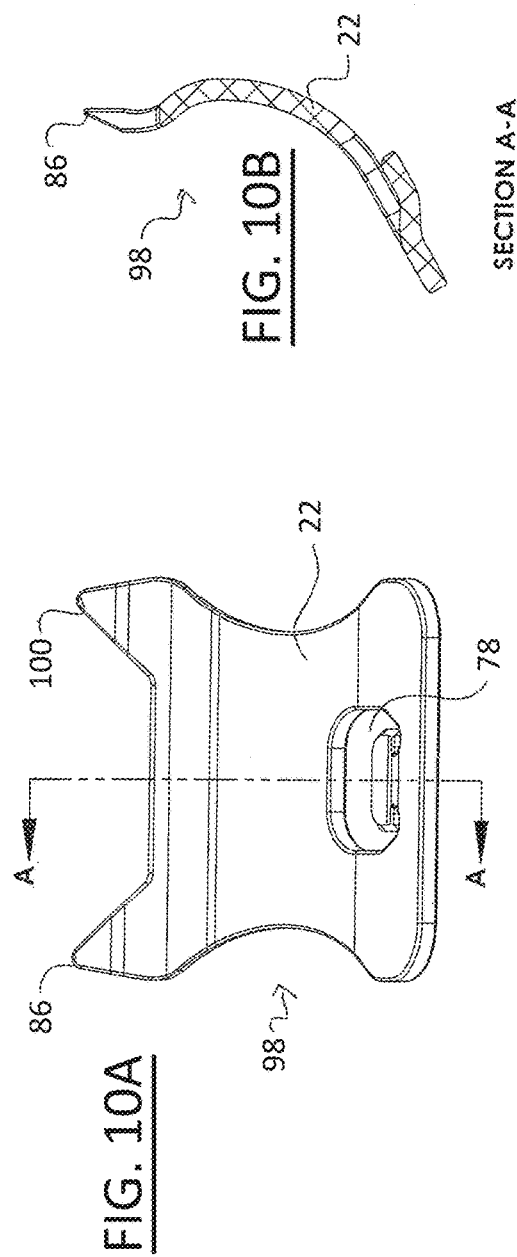
FIG. 10A
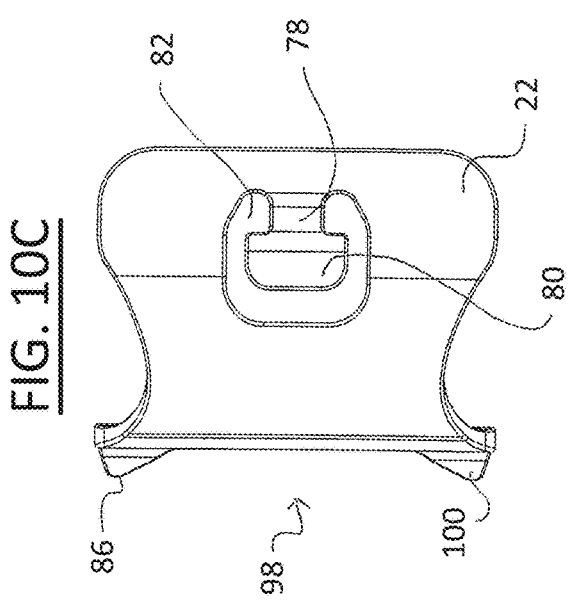
FIG. 10B
SECTION A-A
FIG. 10C

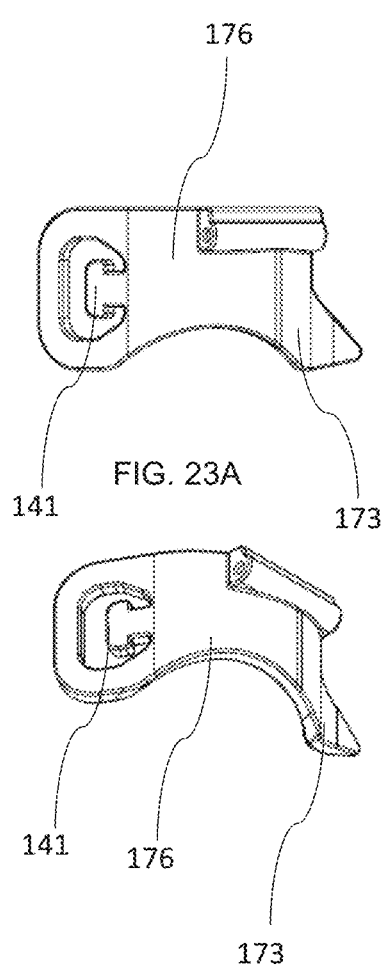
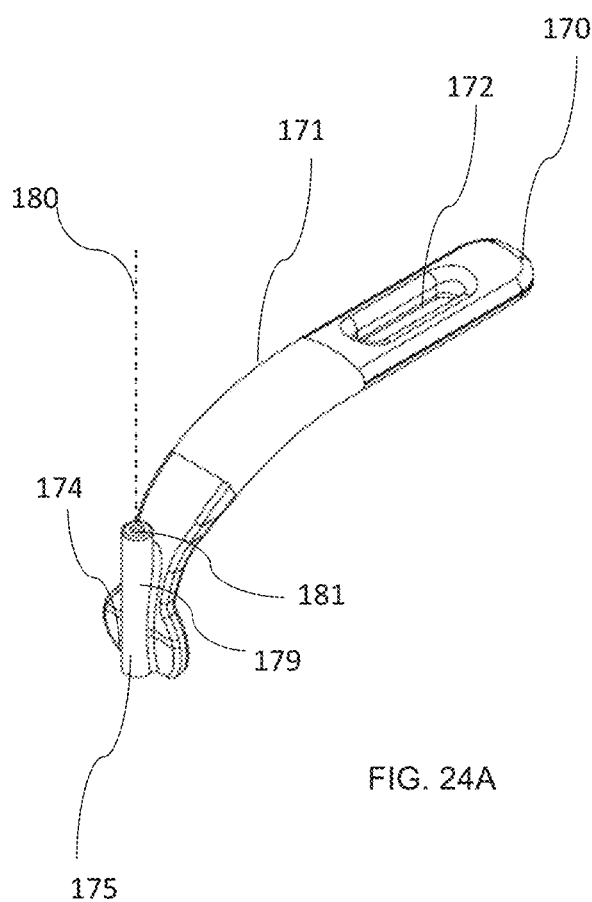
FIG. 23A
FIG. 23B
FIG. 24A

STABILIZING RETRACTOR SYSTEM

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. This application is a continuation-in-part of U.S. application Ser. No. 18/483,277 filed Oct. 9, 2023, which is a continuation of U.S. application Ser. No. 17/368,623 filed Jul. 6, 2021, which claims priority to U.S. Provisional Patent Application No. 63/050,633 filed Jul. 10, 2020, and the present application claims priority to U.S. Provisional Patent Application No. 63/438,742 filed Jan. 12, 2023, the entirety of each of which is incorporated herein by references and is considered part of the specification.

BACKGROUND

A distal radius fracture is one of the more common hand and wrist surgeries performed. Treatment often requires attachment of a surgical implant to bone structures for adding strength. The surgical procedure for addressing this type of fracture can be complicated due to the number and proximity of adjacent structures, such as muscles, ligaments, tendons, and blood vessels that surround this area. The corresponding procedure requires that the tissues and muscles in the wrist be moved so that the bone can be exposed. Various surgical retraction tools are available to manipulate tissues and anatomical structures during surgery. Conventional retractors include manual articulated or rigid elongation members for positioning the adjacent anatomy by manual operation by a surgeon or assistant.

The standard surgical approach to the distal radius is the volar approach which involves making an incision on the volar aspect (the palm side) of the forearm at the wrist level. This allows for a safe and extensile exposure of the fractured aspect of the distal radius, allowing for reduction of the fracture and placement of hardware to retain the fracture in its correct or reduced position. Most commonly this involves using a plate and screws. The challenge here is that there are numerous structures that run longitudinally down the arm into the hand and traverse the surgical field. These need to be retracted and protected in order for the procedure to be performed safely and efficiently. There are two types of surgical retractors: handheld devices which require surgeon or assistant to hold in one hand, and self-retaining retractors which do not need to be held in position manually, once they are inserted into the wound.

Notwithstanding the foregoing, there remains a need for an improved retraction system which stabilizes a joint during surgical repair, for any of a variety of joints and bones, including, among others, in the wrist, the Radius, Ulna and carpals and in the ankle, the Tibia and Fibula.

SUMMARY

Systems are disclosed for stabilizing bones or bone fragments during surgical reduction of a fracture and installation of fixation hardware. Although discussed herein primarily in the context of wrist repair, the stabilizing systems of the present invention may be utilized in a variety of other procedures, in which stabilization and tissue retraction may be desirable, including particularly the ankle repair of either the tibia or fibula, repair of the humerus, repair of a metatarsal, repair of the clavicle, or repair of the femur.

In accordance with one aspect of the present invention, a soft tissue retraction system is provided. The system includes a soft tissue retractor. The soft tissue retractor includes a support body, a bone engaging concavity on a first side of the support body, a soft tissue retracting surface on a second side of the support body, a first guide configured to receive a first pin to anchor the first pin into a bone when the bone is positioned within the bone engaging concavity, and a second guide configured to receive a second pin to anchor the second pin into the bone when the bone is positioned within the bone engaging concavity.

The soft tissue retraction system may further be configured to apply axial compression when the first pin is received within the first guide and anchored into the bone and the second pin is received within the second guide and anchored into the bone. Additionally, the system may be configured to provide rotational translation when only one of the first pin and the second pin is received within its respective guide and anchored into bone. The first guide may include a first lumen and the second guide may include a second lumen. The first pin may extend through the first lumen and second pin may extend through the second lumen to anchor to the bone. The bone may be an ulna, a humerus, a metacarpal, a metatarsal, a fibula, a tibia, a femur, or a clavicle. The soft tissue retractor may be configured to hold a reduction of the bone in place.

The system may include a window configured to receive a bone clamp when the bone is positioned within the bone engaging concavity. The system may include a backing plate. The backing plate may have a concave side configured to conform to an anatomy of a user and the backing plate may have a convex side opposite the concave side. The backing plate may include a curved distal region including a concave side and a convex side and a proximal region having a different curvature than the distal region. The curved distal region may be configured to support a palm and the proximal region may be configured to support a forearm. The backing plate may also include a middle region connecting the proximal region and the curved distal region, wherein the middle region is configured to support a wrist.

In some embodiments disclosed herein, the system may include a tie configured to couple to the soft tissue retractor. The tie may be an elastic tie. The system may include soft tissue retractor being a first soft tissue retractor and may further include a second soft tissue retractor which can include a second bone engaging concavity configured to engage the bone. The tie may be configured to couple to the second soft tissue retractor to connect the first and second soft tissue retractors. The tie may be configured to apply tension to pull a proximal end of the first soft tissue retractor and a proximal end of the second soft tissue retractor away from each other to retract opposing sides of an incision.

In accordance with another aspect of the present invention, a method of treating a fracture is provided. The method includes engaging a bone engaging concavity of a soft tissue retractor with a bone. The soft tissue retractor includes a support body having the bone engaging concavity on a first side of the support body and a soft tissue retracting surface on a second side of the support body. The method further includes advancing a first pin through a first guide of the soft tissue retractor to anchor the first pin into the bone and advancing a second pin through a second guide of the soft tissue retractor to anchor the second pin into the bone.

In some embodiments of the method disclosed herein, the soft tissue retractor may be configured to apply axial compression when the first pin is received within the first guide and anchored into the bone and the second pin is received within the second guide and anchored into the bone. The bone may include an ulna, a humerus, a metacarpal, a metatarsal, a fibula, a tibia, a femur, or a clavicle. The method may also include, prior to advancing the second pin through the second guide, applying rotational translation to the bone using the soft tissue retractor while the first pin is anchored within the bone.

In accordance with one aspect of the present invention, there is provided a stabilizing retractor system for distal radius fracture repair. The system comprises a backing plate configured to support the back of the wrist, the backing plate having a first side accessible on a first side of the wrist, a second side accessible on a second side of the wrist and a longitudinal axis. At least a first soft tissue retractor is also provided, comprising a first support body having a first radius engaging concavity on a first side and on a distal portion of the body and a first soft tissue retracting surface on a second side, and proximal to the first radius engaging concavity.

The stabilizing retractor system may further comprise a second soft tissue retractor, comprising a second support body having a second radius engaging concavity on a first side and a second soft tissue retracting surface on a second side. The system may further comprise a guide on the first soft tissue retractor, configured to direct a wire across the first radius engaging surface. The guide may comprise a lumen, which may extend through the first support body, or may extend through a guide structure carried by the first support body. The lumen may extend along an axis that intersects the surface of the radius in the intended use orientation at an angle that is within about 15 degrees of perpendicular to the surface of the radius, and in some implementations the axis is substantially perpendicular to the surface of the radius.

The system may additionally comprise a connector on a proximal portion of each of the first and second soft tissue retractors, and a tie for attaching the connectors around a back of the wrist and biasing the proximal ends of the first and second soft tissue retractors apart from each other. The tie may be elastic.

The backing plate may have a convex side and a concave side, and may have first and second opposing forceps landing zones on the convex side, configured to facilitate grasping of the retractor system with forceps. The landing zones may comprise an anti slip surface for enhancing attachment of the forceps, which may be a plurality of surface deviations such as a plurality of projections or a plurality of recesses or a plurality of apertures.

There is also provided a soft tissue retractor, having an elongate, curved support body having a proximal end and a distal end and a curved long axis that exceeds the length of a short, transverse axis. A radius engaging concavity may be located on a first side of the body in a distal portion of the body. A concave soft tissue retracting surface may be provided on a second side of the body, and proximal of the radius engaging concavity. An inflection point may occur on the body in between the radius engaging concavity and the soft tissue retracting surface. The inflection point may occur in the distal one half of the body, or in the distal one third or one quarter of the length of the body.

A guide may be provided for guiding a pin over the radius engaging concavity to engage the radius when positioned within the radius engaging concavity. The guide may comprise a lumen. A connector may be provided on the body spaced apart proximally from the radius engaging concavity, for connection to a tie.

Preferably the body is radiolucent, enabling the reduced and stabilized wrist and attached retractor system to be moved as a unit for Xray imaging, and moved back out again without disrupting the orientation of the bones and retractor system.

There is also provided a stabilizing retractor kit. The kit may include a backing plate; a first and second soft tissue retractors; and a tie for connecting the first and second soft tissue retractors. The kit may also include a drill guide.

There is also provided a method of treating a distal radius fracture. The method comprises positioning a backing plate with a wrist contacting front surface and a back surface along the back of a wrist. A distal end of a first soft tissue retractor is engaged with a first side of a radius, and a distal end of a second soft tissue retractor is engaged with a second side of the radius. A proximal end of the first soft tissue retractor and a proximal end of the second soft tissue retractor are moved away from each other to retract opposing sides of an incision; and the first and second soft tissue retractors are connected to retain the incision open. The connecting step may comprise connecting the first and second soft tissue retractors with a tie extending around the back surface of the backing plate. The tie may bias the proximal ends away from each other, and may be elastic. The method may additionally comprise the step of anchoring the first and second soft tissue retractors to the radius.

The method may additionally comprise the step of moving the patient's wrist with the attached stabilizing retractor system into an Xray or other imaging modality field of view, and inspecting the fracture without the stabilizing retractor system blocking any of the image of the fracture and adjacent bones. The wrist may then be moved back out of the imaging field of view for further steps, without having disturbed the fracture. Further steps may include adjustment or installation of fixation hardware, further adjustment of the fracture or removal of the stabilizing retractor system and closure of the surgical site.

There is also provided a method of retracting soft tissue from an incision site to expose a bone. The method may comprise engaging a distal end of a first soft tissue retractor with a first side of the bone, and engaging a distal end of a second soft tissue retractor with a second side of the bone. A proximal end of the first soft tissue retractor and a proximal end of the second soft tissue retractor are moved away from each other to retract opposing sides of an incision; and the first and second soft tissue retractors are connected to retain the incision open. The connecting step may comprise connecting the first and second soft tissue retractors with a tie. The tie may bias the proximal ends of the first and second soft tissue retractors away from each other to retract tissue away from the incision. The tie may be elastic. The method may additionally comprise the step of anchoring the first and second soft tissue retractors to the bone.

The method may further comprise the step of imaging the bone through the retractors with the retractors anchored to the bone, at one or more times during the procedure, enabled by the radiolucent material of the retractors. The method may further comprise the step of reducing two adjacent bone fragments to form a union and placing a plate over the union. The method may additionally comprise the step of clamping the plate against the union and moving the plate, soft tissue retractors and union into an X-ray beam. The clamping step may comprise providing a clamp having a first jaw and a second jaw, placing the first jaw against the plate and placing the second jaw against a convex side of a backing plate attached to the first and second soft tissue retractors. The clamp may then be used to move the retractors, plate and union away from a surgical table, into and out of an X-ray beam and back to the surgical table while maintaining the spatial relationship of the union, plate and retractors without relative movement. In one implementation of the invention, the plate is a volar plate.

In any of the systems and methods disclosed herein, a retractor can be left side or right side specific, or universal to both sides. The retractor may be configured with or without a lumen, and can have a single distal tip or two or more distal tips to facilitate insertion and prying.

A number of the steps in the procedure can be varied in accordance with clinical preference. For example, if the K-wire is placed first, a twisting motion of the left and right retractors opens the incision to facilitate placing the distal tip. If the tip is anchored first and then the retractor is retracted back against soft tissue before placing the K-wire, the surgeon will have better visualization for the K-wire placement in the bone.

In some applications of the method, the bone may be a radius, ulna, or carpals in the wrist or a fibula or a tibia in the ankle.

BRIEF DESCRIPTION OF THE DRAWINGS

FIGS. 6A-6G are detail views of a backing plate.

FIGS. 7A-7D are detail views of a soft tissue retractor.

FIGS. 8A-8B are detail views of a drill guide.

FIGS. 9A-9C are additional detail views of a drill guide.

FIGS. 10A-10C are detail views of a soft tissue retractor configured for use on the fibula.

FIGS. 23A-23B illustrates a radial retractor.

FIG. 24A illustrates a universal retractor.

DETAILED DESCRIPTION OF THE PREFERRED EMBODIMENT

Figure 1:
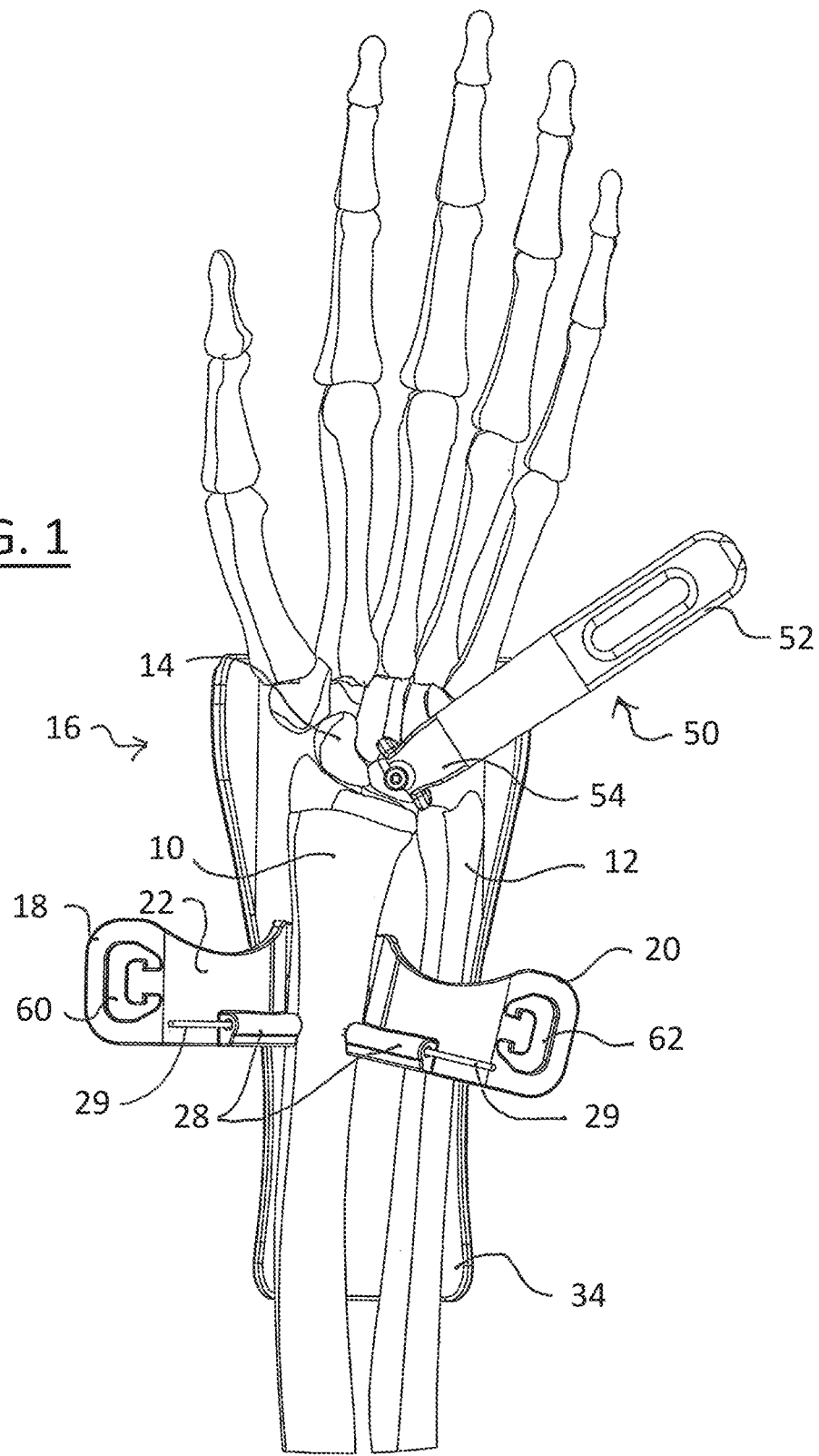
FIG. 1 is a schematic representation of a stabilizing retractor system attached to a radius.
Figure 2:
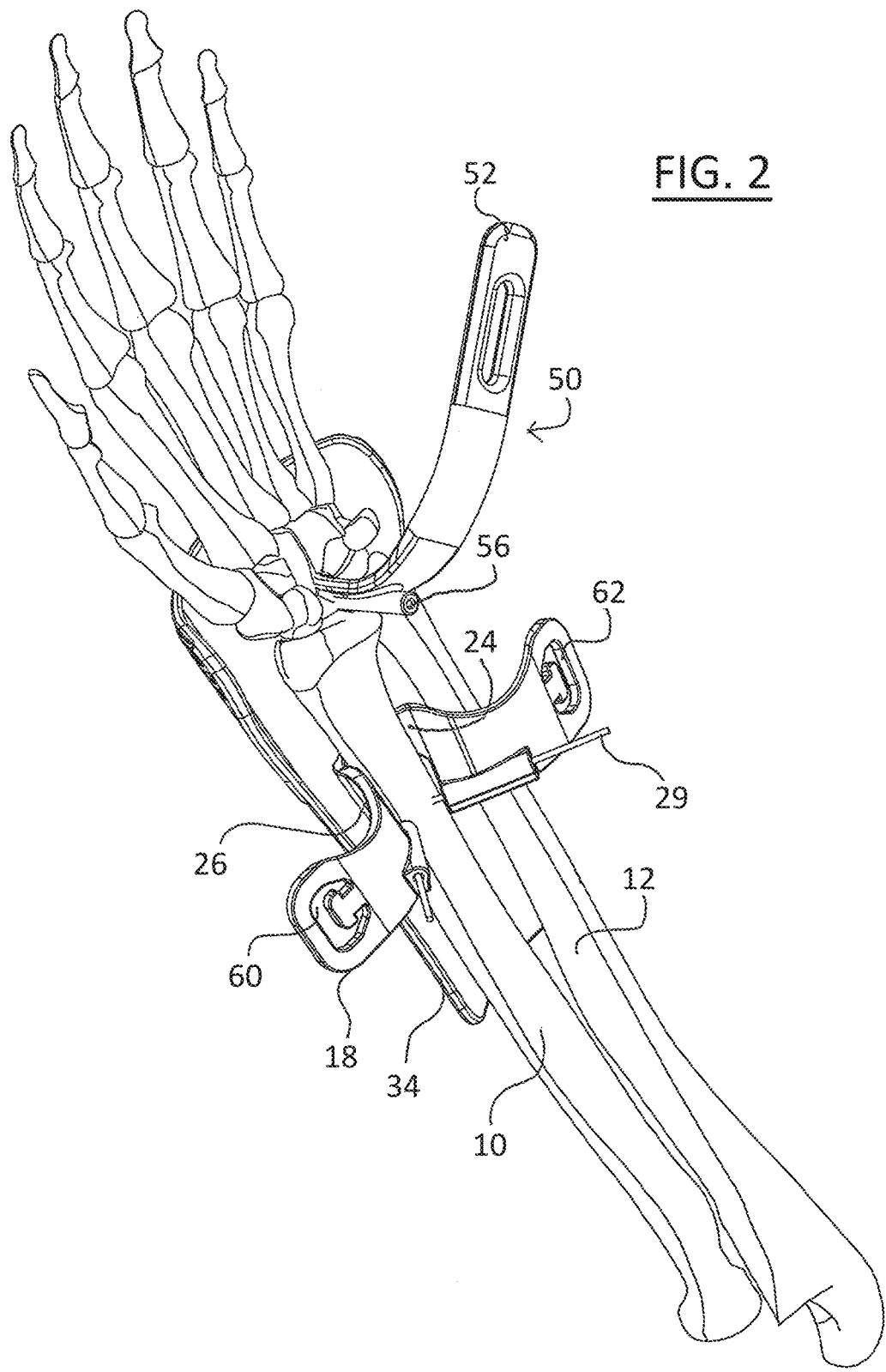
FIG. 2 is a perspective view of the system of FIG. 1.
Figure 3:
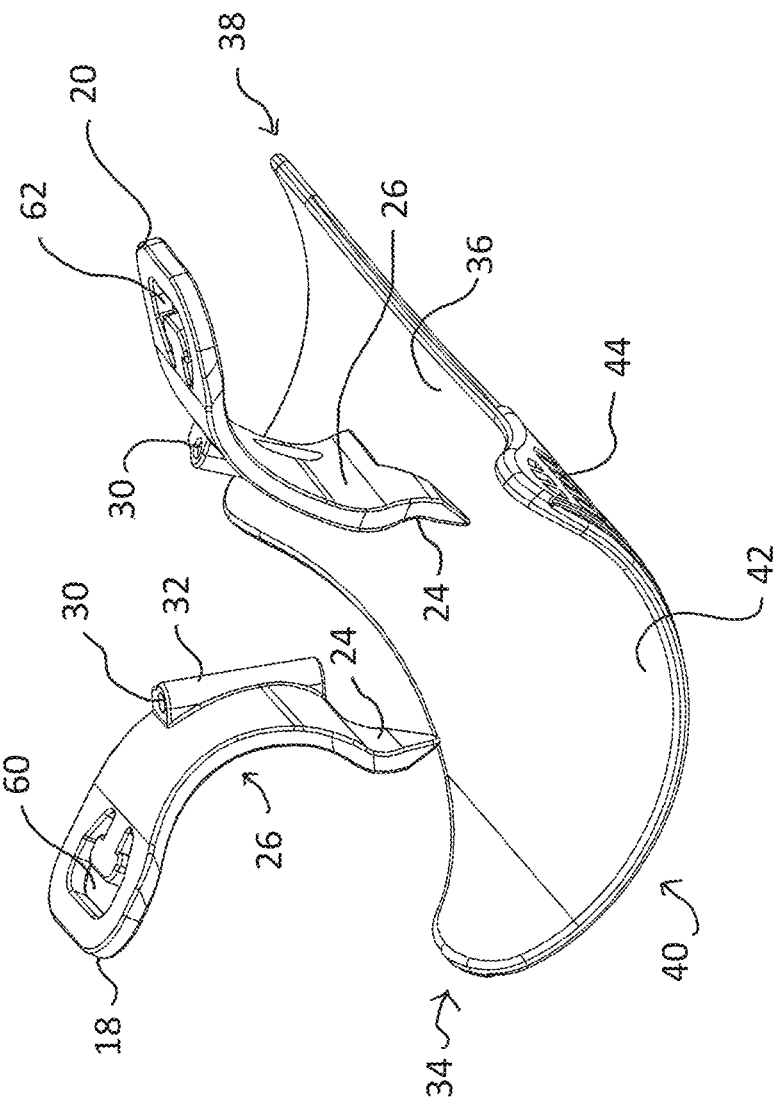
FIG. 3 is an exploded perspective view of a backing plate and two soft tissue retractors.
Figure 4:
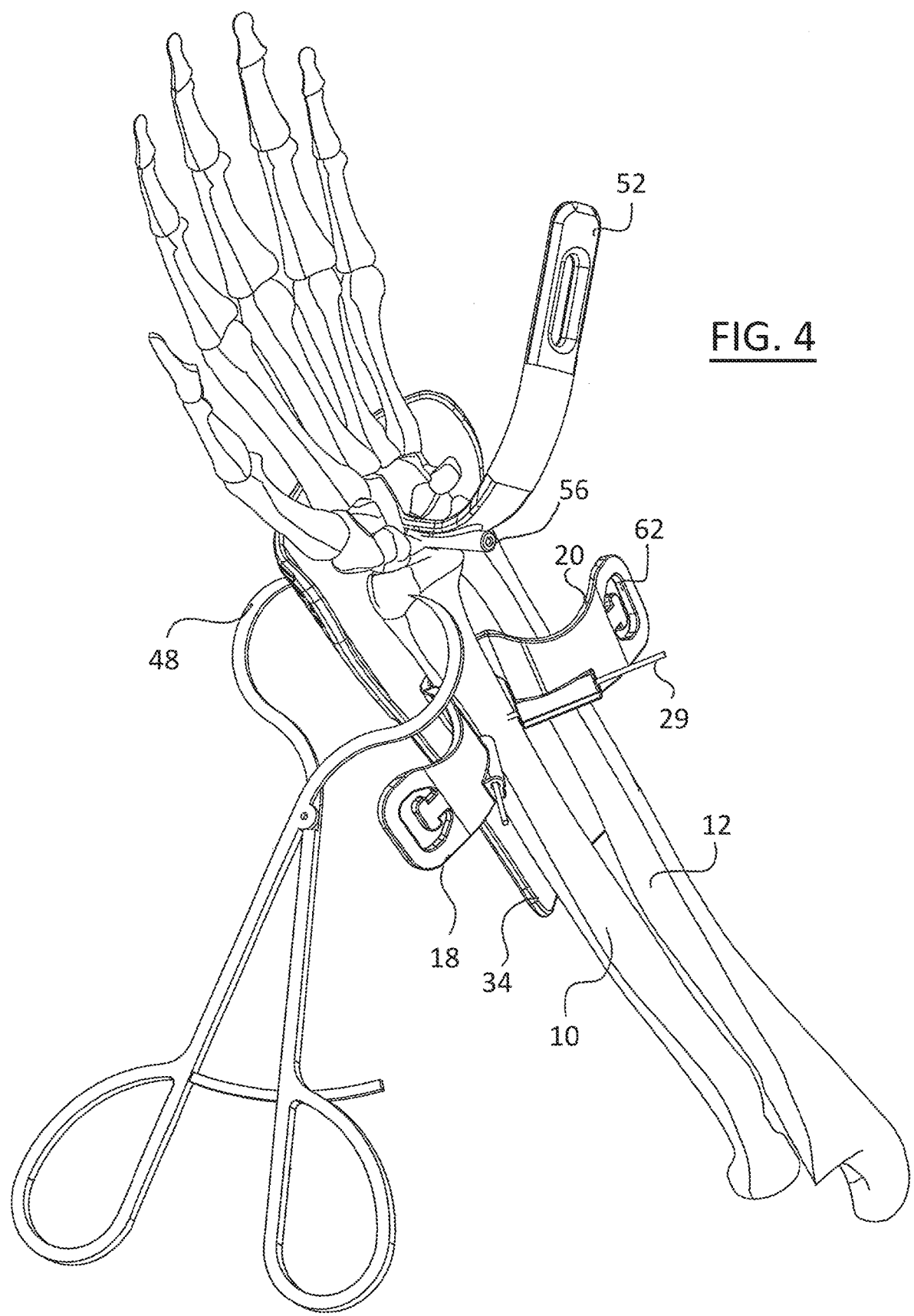
FIG. 4 is a top perspective view as in FIG. 2, shown being grasped by forceps.

The stabilizing retractor system of the present invention enables a surgeon to place a joint or limb in a pre-determined position, retract tissue from an incision site, and stabilize the retractors by securing them to an adjacent bone. This eliminates the need for additional clinical personnel to hold the retractors. Although the system described herein can be readily adapted to other surgical procedures throughout the body, it will be detailed herein primarily in the context of wrist or hand surgery as an example. The invention can be readily expanded to multiple other areas with elbow, shoulder, knee, ankle (Tibia and Fibula), spine, pelvis, and hip surgery being of particular emphasis.

In the context of a wrist surgery, the stabilized retractors also allow the surgeon to manipulate the wrist and location of an implant into a desired orientation, and move the wrist into and out of an X-ray field of view while maintaining the relative orientation of the wrist and of the implant relative to adjacent bone. This enables fine adjustments to the implant based upon the X-ray image since the orientation of the wrist and implant is maintained by the stabilized retractors.

The system may be constructed of radiolucent plastic components that can be fabricated through 3D printing or other more traditional methods like injection molding or thermo-forming. Components may be packaged for a single patient procedure and pre-sterilized. Components may be single use only and disposable. Components sizes may vary based on areas of the body (e.g., elbow, shoulder, knee, ankle (Tibia and Fibula), spine, pelvis, and hip).

During the surgical procedure, the clinician will position a primary support shell underneath the limb or joint to be accessed. The clinician will make an incision and then utilize a first and second opposing retractors retract the tissue. The retractors are next fixed with respect to adjacent bone to maintain the retracted tissue. Fixation may be accomplished by pinning each retractor to the radius using at least one pin (e.g., an attachment pin, threaded pin, non-threaded pin, or K-wire) per retractor.

It is likely that each system will thus include 1 support shell and 2 retractors. Each system may be configured with more components based upon customization. The additional components may include, for example, wire or wraps to secure the retractors adequately to the patient, and one or more elastic ties to secure the retractors to the support shell. The components may have attachment anchor guides such as holes and slots as necessary to allow for complementary attachment anchors or attachment to other components.

Customization for use in complicated cases may occur by 3D printing of parts based upon scanned image data on a patient by patient basis. Customization could also be more generic to a particular surgical procedure.

Conventional retractors are metallic and therefore impervious to X-ray imaging. This has impact to the Clinician, the assistant, and the patient. The clinician routinely risks chronic exposure to radiation through repeated exposure of hands, neck, and eyes during examination of the patient. The assistant has similar risk of exposure of radiation to the body (e.g., hands, neck, and eyes). Routinely, the assistant and clinician will remove the retractors so that imaging of the reduced bone union and implants can be clearly seen. When the retractors are removed, the clinician or assistant must insert their hands into the x-ray field to try to keep the fracture stable. Maintaining the union stable is not always achieved, potentially requiring additional repositioning and imaging steps. Also, with repeated insertion and removal of the retractors, there is increased risk to nerve and tendons that are repeatedly stretched and manipulated by rigid metallic retractors.

Referring to FIG. 1, there is illustrated a simplified view of the volar aspect of the forearm at the level of the wrist, including a radius 10, an ulna 12, and a scaphoid 14. Numerous additional small bones in the wrist and hand are not discussed herein but are understood in the art.

A stabilizing retractor system 16 in accordance with the present invention is illustrated as mounted to the radius 10. Surrounding soft tissue has been omitted for clarity, however the retractor system 16 will be utilized to separate opposing soft tissue sides of a surgical cut down to expose the radius 10 as is understood in the art.

The system 16 includes a first retractor 18 and a second complementary retractor 20. The second retractor 20 may be a mirror image and/or have similar functionality to the first retractor 18, so primarily only a single retractor will be described in detail.

Retractor 18 comprises a support 22 such as a contoured plate, which will be described in greater detail below. In general, the support 22 includes a radius engaging surface 24 on a first side of the support 22, and a soft tissue retracting surface 26 on a second, opposite side of the support from the radius engaging surface 24. The retractor may be characterized as having a long axis and a transverse short axis.

Support 22 additionally comprises a guide 28 defining a lumen 30 for axially movably receiving an attachment pin 29 (e.g., a K wire, threaded fixation device, or non-threaded fixation devices) for securing the support 22 to the radius 10. The lumen 30 may extend directly through the support 22, or extend through a separate guide structure 32 carried by the support 22. The lumen 30 may be oriented to receive the K wire along a path that is substantially perpendicular to the adjacent surface of the radius 10 in the as mounted orientation. The axis of the guide 28 is generally within about 20 degrees, in many implementations within about 15 degrees or 10 degrees or less of parallel to the long axis. In the illustrated configuration, the guide 28 is substantially parallel to the long axis.

The retractor system may additionally comprise a backing plate 34, for positioning on the opposite side of the wrist from the incision. The backing plate may comprise an elongate arcuate body 36 having an (anatomically as used) proximal end 38, a distal end 40, and an elongate concavity 42 for receiving the wrist.

Figure 5:
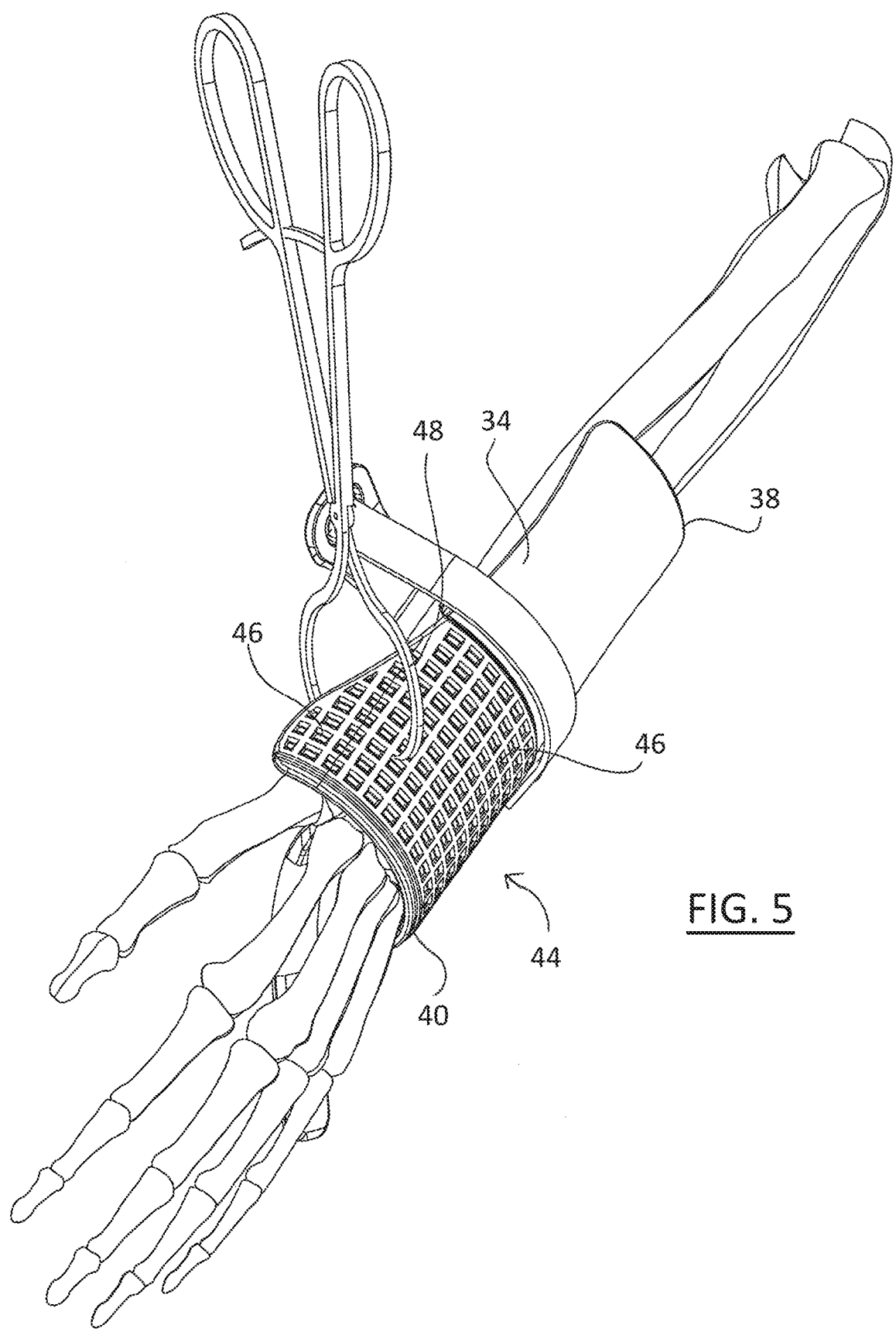
FIG. 5 is a bottom perspective view as in FIG. 2, shown being grasped by forceps.
Figure 6D:
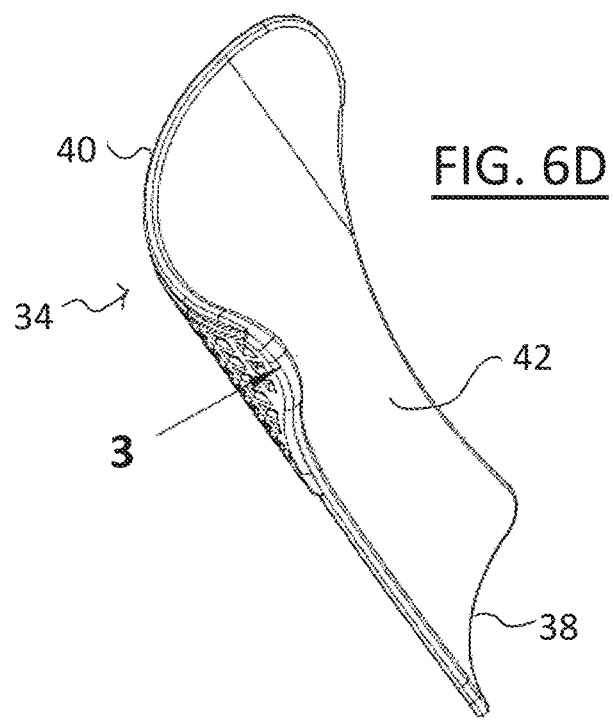
Figure 6E:
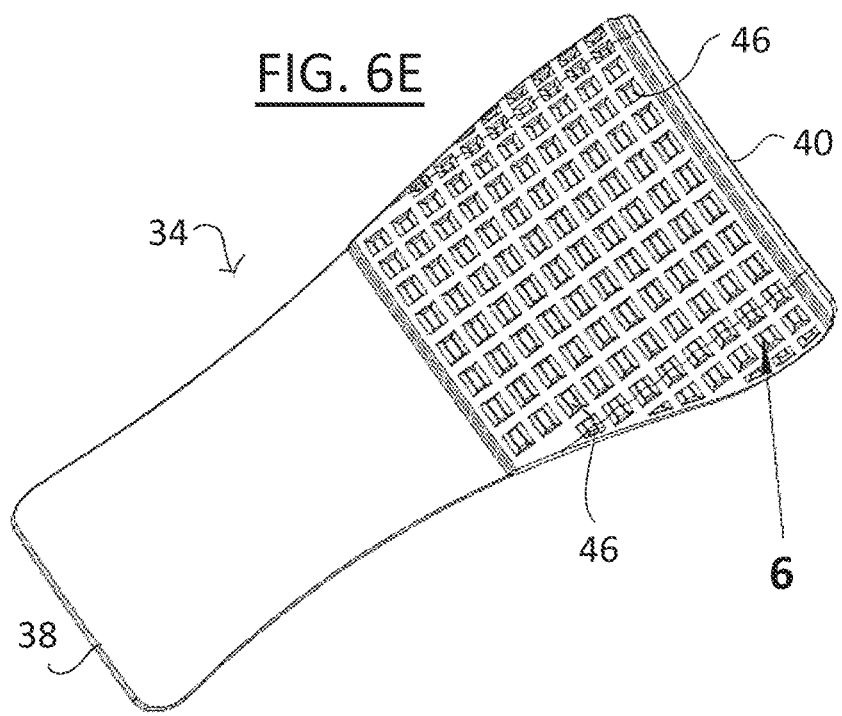

A convex side of the body 36 may be provided with a forceps landing zone 44, comprising a plurality of recesses 46 for receiving a forceps prong 48 as shown in FIG. 5. At least about 10 or 20 or 50 or more recesses 46 may be provided to produce a large landing zone so that the surgeon will obtain first try engagement of the forceps with the blind side of the backing plate 34 when grasping the stabilized wrist with the forceps such as to move it into a visualization (X-Ray) field and back to the table.

The system 16 may additionally include a drill guide 50 (or a targeting guide) having a proximal handle 52 and a distal guide 54. The guide 54 includes a guide path such as a lumen 56 for receiving a drill or pin (e.g., an attachment pin, threaded pin, non-threaded pin, or K-wire) (not illustrated).

Each of the first retractor 18 and second retractor 20 may be provided with a connector 60, 62, respectively. The connector 60, 62 may comprise an aperture, post, snap or other connector for receiving a tie to connect to the backing plate 34. The tie may be elastic, and mounted under tension to place a radially outwardly bias on the connectors 60, 62 to maintain the soft tissue in the retracted orientation. In one implementation of the invention, a single elastic tie may be attached to a first connector, extended around the back of the backing plate, tensioned, and attached to the second connector.

Additional details of a backing plate 34 suited particularly for the wrist are illustrated in FIG. 6A-6G.

Additional details of a soft tissue retractor are illustrated in FIGS. 7A-7D. The first retractor 18 comprises a support body 22 extending between a proximal end 70 and a distal end 72. A connector 76 is provided near the proximal end 70, such as for connection to a tie as has been discussed. The connector 76 may include a post 78 having one end connected to the support 22 and the other end carrying a closed loop or a transverse stop 80 which may reside in an aperture 82 in the support 22. An elastic tie may be looped around the post 78, and restrained from slipping off by the transverse stop. The elastic tie may be looped around the back of the wrist and connected to the corresponding connector on the second retractor, under tension, to pull the first and second retractors away from each other.

The radius engaging surface 24 is provided near the distal end 72, and is separated axially from the soft tissue retention surface 26 by an inflection 84. The soft tissue retention surface 26 may be provided with a greater width than the width of the radius engaging surface 24. In the illustrated implementation, radius engaging service 24 is provided on a projection 86 extending distally beyond the distal end of the guide structure 32, and having a maximum width of no more than about 70%, or no more than about 50% or less of the width of the soft tissue retention surface 26. The width of the projection tapers smaller in a distal direction to a rounded tip 88 which is spaced apart laterally from the longitudinal axis of the lumen 30.

FIGS. 8A-8B show additional details of a lunate retractor which also doubles as a drill guide. The drill guide 50 includes a proximal handle 52 adjacent the proximal end 90 of the drill guide 50. An angled or arcuate body 92 connects the proximal handle 52 and a tubular guide 94 containing a lumen 96 configured to axially removably receive either a drill or a bone anchor such as a pin or other metallic fixation device (e.g., an attachment pin, threaded pin, non-threaded pin, or K-wire). The longitudinal axis of the lumen may be at least about 45° and preferably between about 80 and 110° from the longitudinal axis of the proximal handle 52. This facilitates grasping the proximal handle 52 and pressing the distal end 54 against the radius when used as a drill guide, or against the lunate, when used for lunate fixation and retraction. In some embodiments, the lunate retractor may be a universal retractor. In some embodiments, the lunate retractor may be a universal pin-in-place retractor.

Figure 13A:
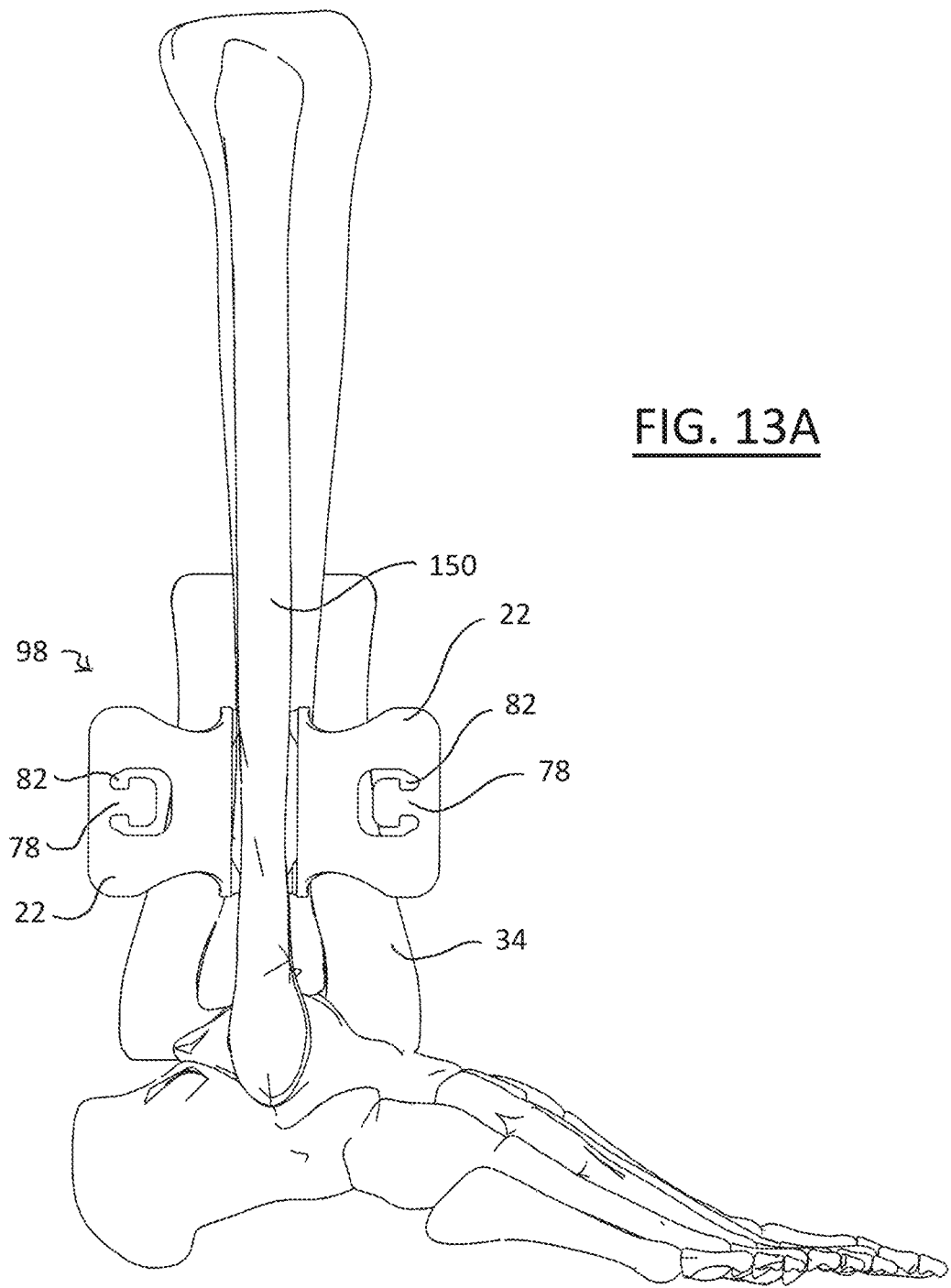
FIGS. 13A-13B illustrate a fibula retraction and stabilization system in relation to the ankle.
Figure 13B:
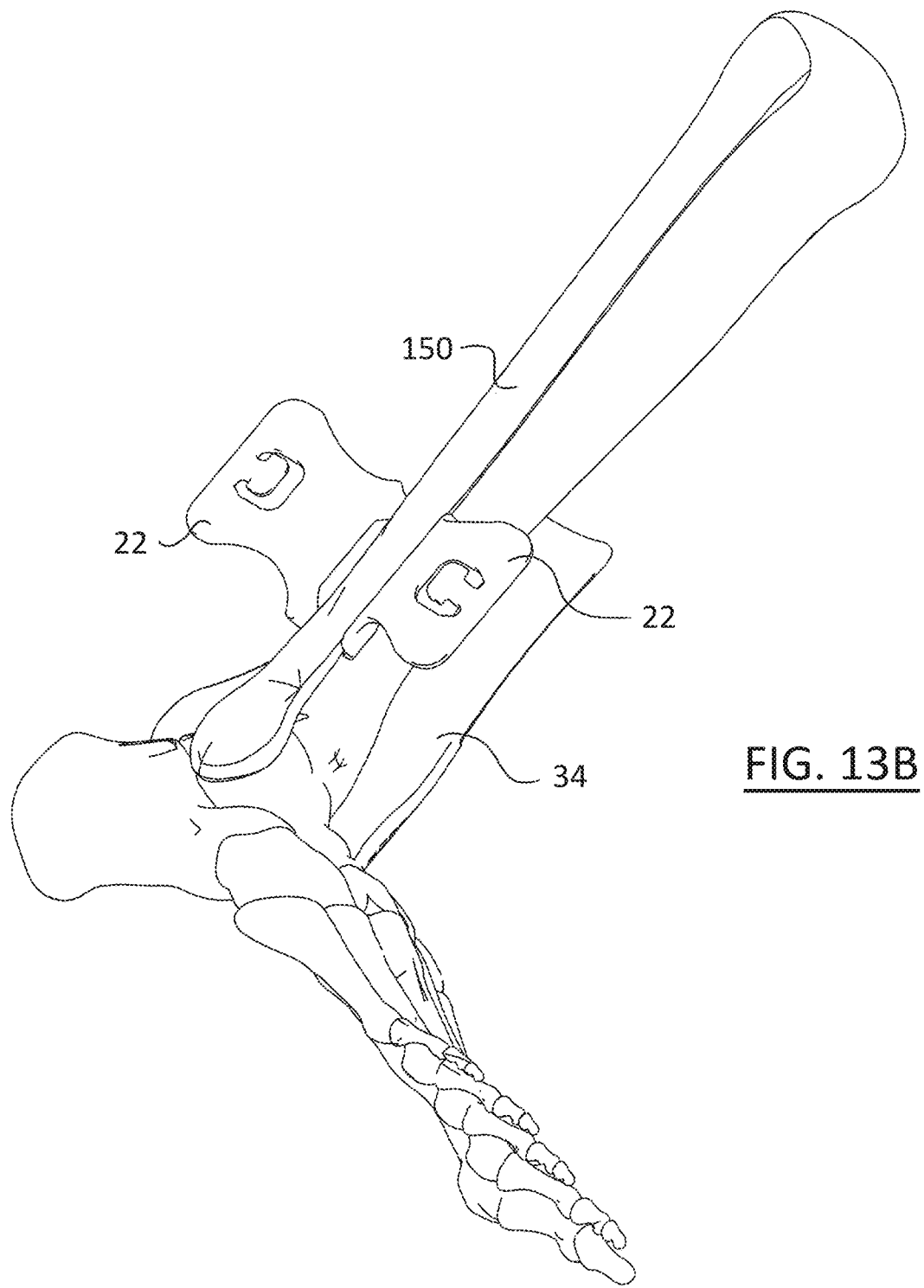

FIGS. 10A through 10C show details of a fibula retractor 98 utilized in an ankle repair procedure on a fibula 150. The fibula retractor 98 is similar to the wrist retractors illustrated previously, except that the distal end 72 of the support 22 is provided with a first distal projection 86 and a distinct second distal projection 100, spaced apart and configured to hook around the bone and resist torsional movement and facilitate increased surface area of the soft tissue contacting surface. Fibula retractors and corresponding backing plate are shown in relation to the ankle in FIGS. 13A-13B, below.

Figure 11A:
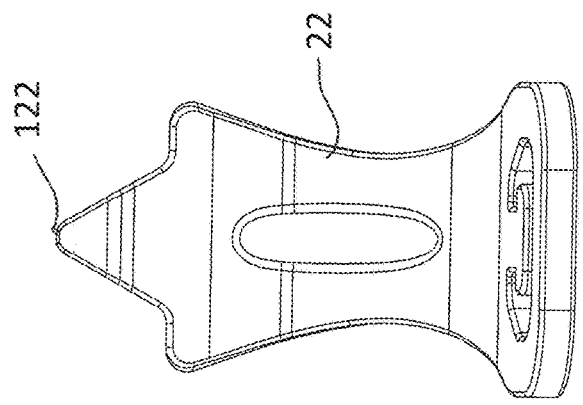
FIGS. 11A-11B are detail views of a soft tissue retractor configured for use on either side of an incision.
Figure 11B:
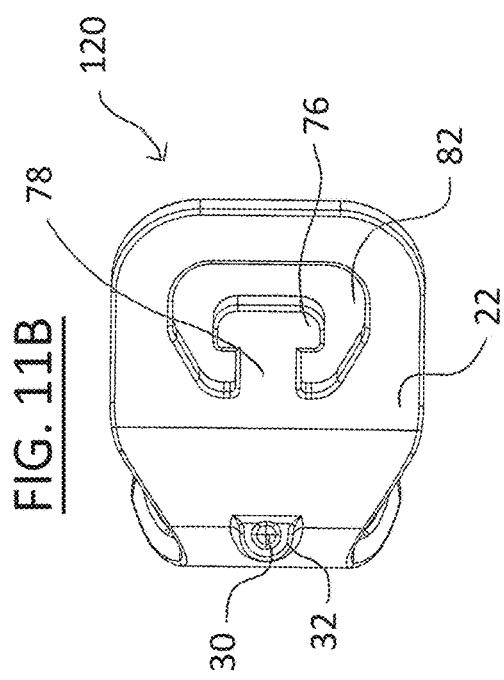

FIGS. 11A-11C illustrate an alternative universal soft tissue retractor 120 which is similar to retractors disclosed previously herein except that the universal retractor 120 can be used on either the right or left side of the incision while previously disclosed retractors were configured for separate left and right side placement. One structural distinction for the universal retractor 120 is the relationship between the K-wire lumen 30 and the tip 122. In use a surgeon may sink the K-wire through the lumen 30 and into the bone, then a twisting moment is created when the previously described retractor is rotated around the K-wire to engage the tip 122. For the universal retractor 120, the intent is to engage the tip 122, then angle back and secure the K-wire. But they are both aligned along a central longitudinal axis of the body 22, so no twisting moment is created.

The proximal portion of the retractor (see, e.g., FIG. 7B) has a longitudinal axis that is at a non normal angle to the longitudinal axis of the K-wire lumen. This is designed to allow the proximal portion of the retractor to reside close to horizontal to the table plane, extending away from the incision and out of the way of the surgeon. This proximal portion acts as a lever which the elastics are always pulling down to keep them out of the way for the surgeon and to keep the retraction of the tissue tight.

Figure 12C:
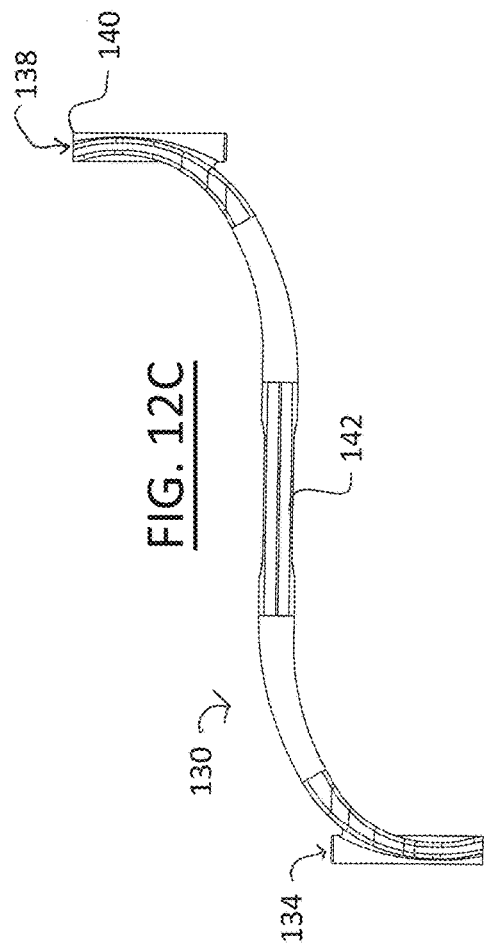
FIGS. 12A-12C illustrate a dual headed lunate anchor and drill guide.
Figure 12B:
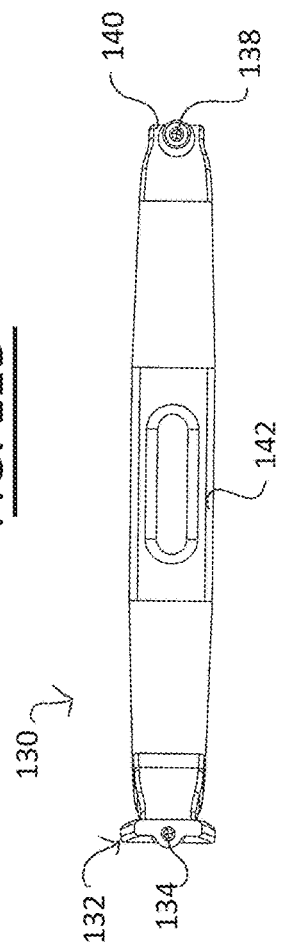
Figure 12A:
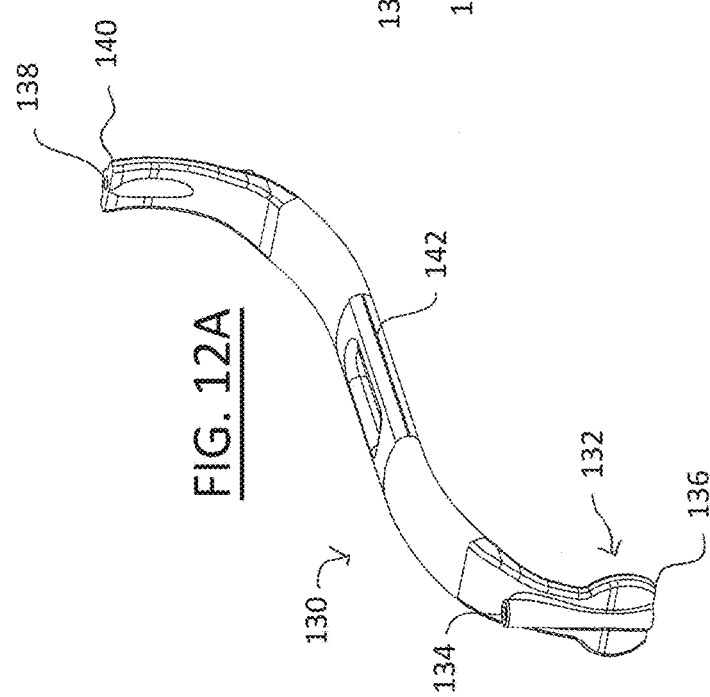

FIGS. 12A through 12C illustrate details of a dual headed lunate fixation tool (which may be a universal pin-in-place retractor) and drill guide 130. The dual headed lunate offers the use of two different profiles. A first profile has a bulbous working end 132 which engages more linear length of the incision compared to the second narrow working end engages less. A first guide lumen 134 is provided at a first end 136 and a second guide lumen 138 is provided at a second end 140 of the drill guide 130. The first and second guide lumen may be substantially parallel to each other and joined by a handle portion 142. The drill guide 130 provides the surgeon with two different bone engaging surfaces and drill guide geometry from which to select in a given procedure.

Figure 14A:
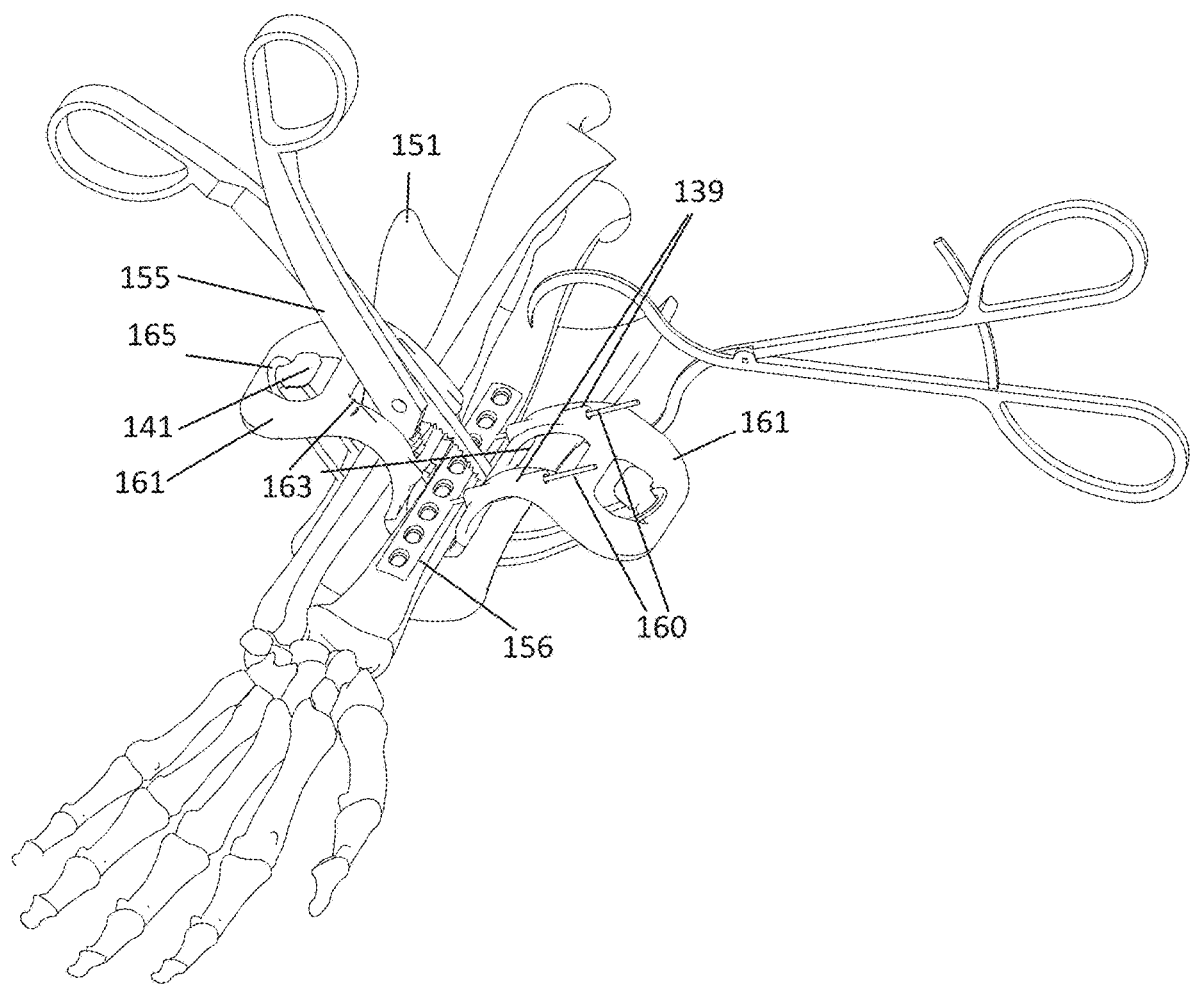
FIG. 14A-14C illustrate a retraction and stabilization system for use on a radius.
Figure 14B:
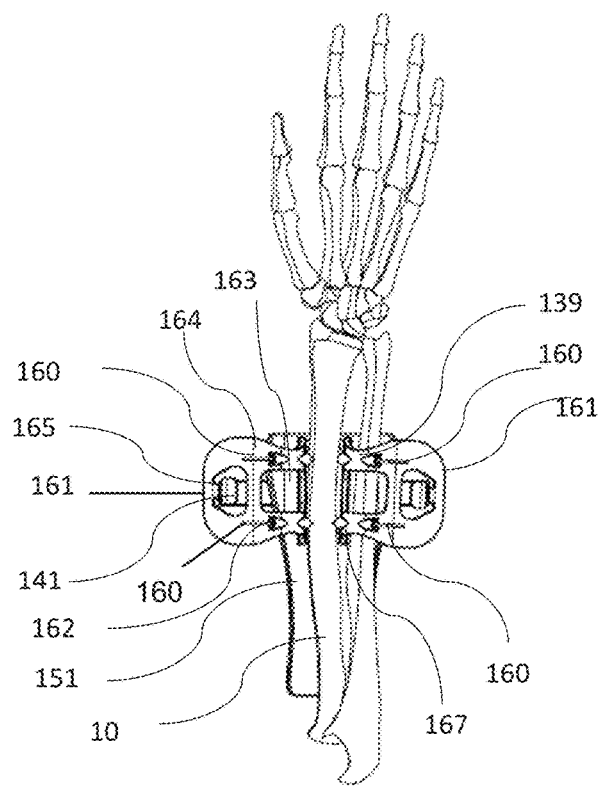
Figure 14C:
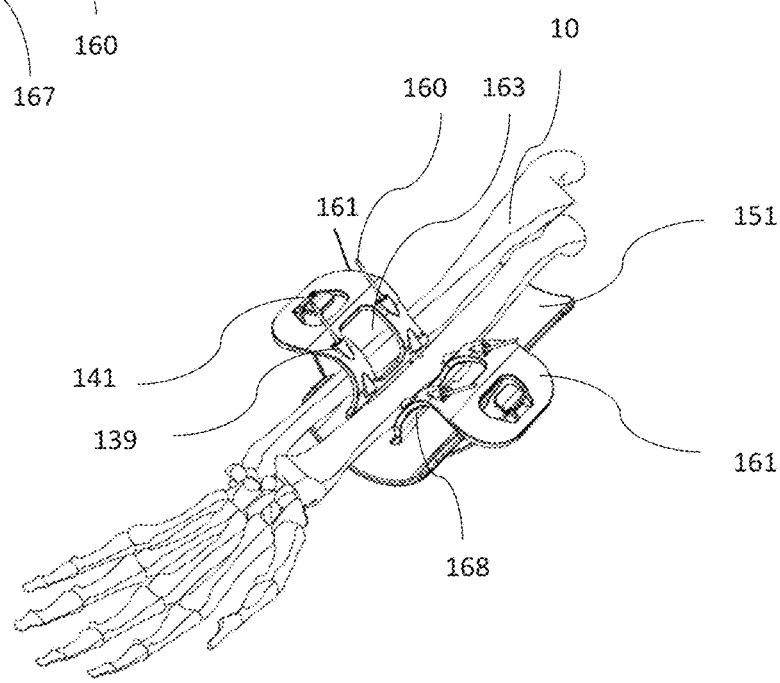

FIGS. 14A-14C illustrate an embodiment of a retraction and stabilization system for use on a radial fracture. The system may include any of the same or similar features and functions as any of the other systems described herein. The system may be a diaphyseal set applied to radial shaft fractures.

As shown in FIGS. 14A-14C, each retractor 161 can include two guide structures 139. Each guide structure 139 can have a lumen 162 configured to receive a pin 160 (e.g., an attachment pin, a threaded pin, a non-threaded pin, a K-wire, or a metallic rod) or other metallic fixation device for securing the retractor 161 to the radius 10. The guide structure 139 can receive a first portion of the pin 160 (e.g., 25% of the pin 160) while the bone receives a second portion of the pin 160 (e.g., 25% of the pin) while the remaining portion of the pin 160 is exposed or extends out of the lumen 162 (e.g., 50%). Advantageously, having two guide structures 139 with two attachment pins (e.g., pin 160) can provide additional stability and can improve fixation to the bone (e.g., radius 10). The pin 160 and retractors 161 can help derotate and align the bone (e.g., to help with bone reduction). Additionally, the retractor 161 and pins 160 can hold the reduction of the bone in place until an implant (e.g., implant 156) is inserted. The retractors 161 and pins 160 can serve as a temporary fixation device during a surgical procedure.

As shown in FIG. 14A, a bone clamp 155 may also be used to further help with the reduction (e.g., by providing additional stabilization). In some embodiments, each retractor 161 (e.g., two retractors 161) can include a window 163 in a body 164 of the retractor 161 that may allow for positioning of the bone clamp 155 to further help with the reduction (e.g., by providing additional stabilization). The window 163 can be sized and configured to allow a user to position a device through the window 163. For example, at least a portion of the bone clamp 155 can extend through the window 163 (e.g., the window 163 on each retractor 161). The windows 163 may enable access to the bone (e.g., radius 10) without impeding the retractor 161. In some embodiments, multiple clamps 155 may be used with the retraction and stabilization system. One advantage of the window 163 is that the bone clamp 155 (e.g., multiple bone clamps 155) can provide additional support. As shown in FIG. 14A, an implant 156 may be used with the retraction and stabilization system. The retractor 161 can have a bone engaging surface 167 (e.g., on or adjacent to the body 164) which can be concave and a tissue engaging surface 168 on the opposite side of the retractor 161. The bone engaging surface 167 can be on a distal end of the retractor 161.

As further shown in FIGS. 14A-14C, a tie 165 (e.g., an elastic tie, elastic band, etc.) may be looped around connectors 141 of each retractor 161. The elastic tie 165 may be looped around the back of the forearm and/or the backing plate 151 (See FIGS. 19A-19C) and apply tension to pull the retractors 161 away from each other. Advantageously, by positioning the elastic tie 165 around the connectors 141 a user can have greater access to the bone during a surgical procedure. For example, a surgeon can have the use of both hands during a surgical procedure when the elastic tie 165 applies the necessary force to keep the surgical area exposed.

Figures 15A, 15B:
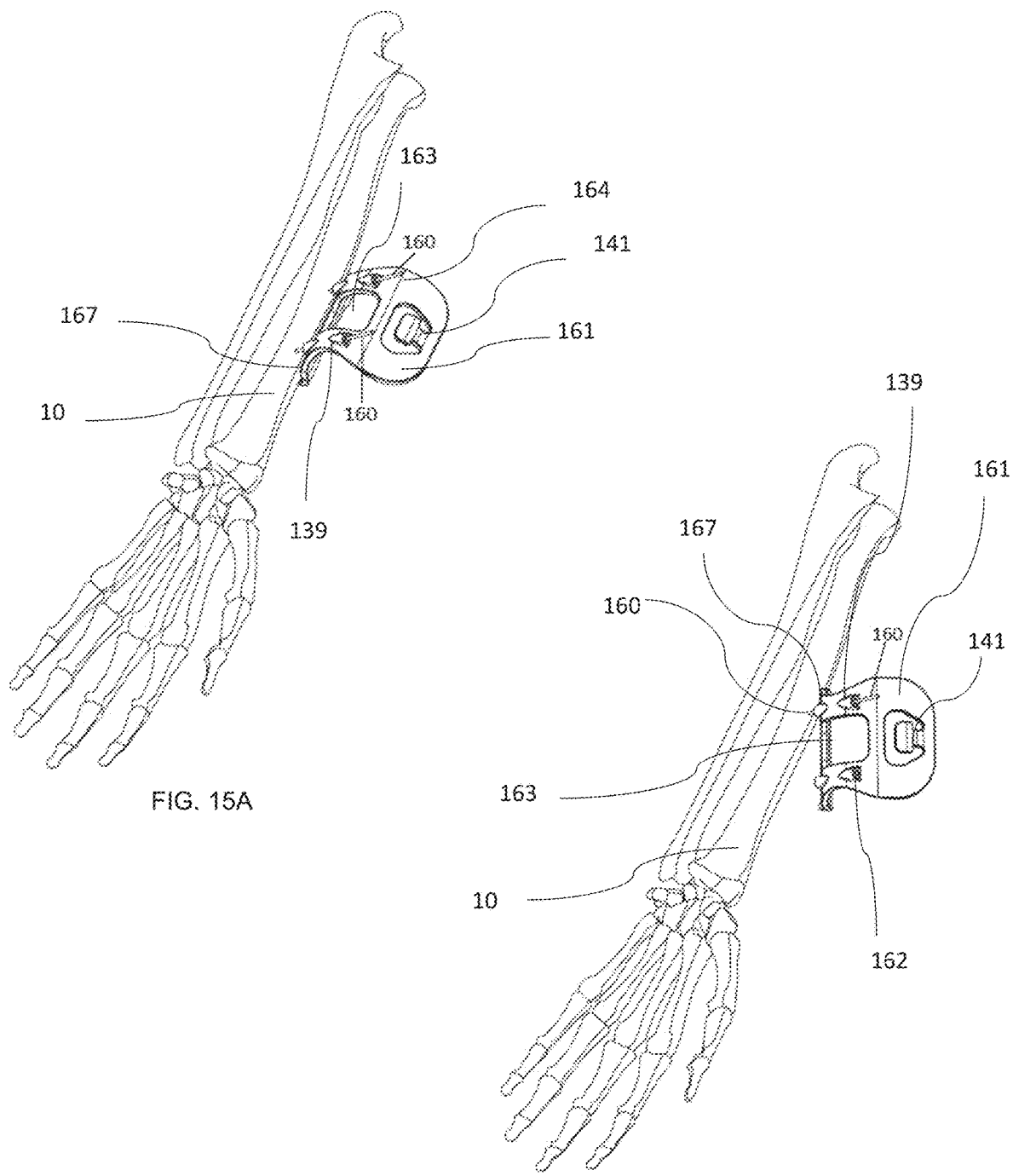
FIGS. 15A-15B illustrate a retractor attached to a radius with various arrangements of pins.

FIGS. 15A through 15B illustrate one of the retractors 161 attached to the radius 10. In FIG. 15A, pins 160 extend through each of two lumens 162. When multiple lumens 162 (e.g., two as shown in FIG. 15A or more) are used to receive corresponding pins 160 and the pins 160 are anchored into bone, a reduction and fixation feature is provided. For example, when multiple lumens 162 (e.g., two as shown in FIG. 15A or more) are used to receive corresponding pins 160, and the pins 160 are anchored into the bone, axial compression can be applied to the bone. Alternatively, as shown in FIG. 15B, in some embodiments, only a single lumen 162 may receive a pin 160 therethrough and the single pin 160 can be anchored into the bone. When only one lumen is used to receive a corresponding pin 160 anchored into the bone, a rotational lever arm may be provided. In such embodiments, the retractor 161 can provide rotational translation of the bone. For example, the retractor 161 may be manipulated to cause rotational translation of the bone.

Figures 16A, 16B:
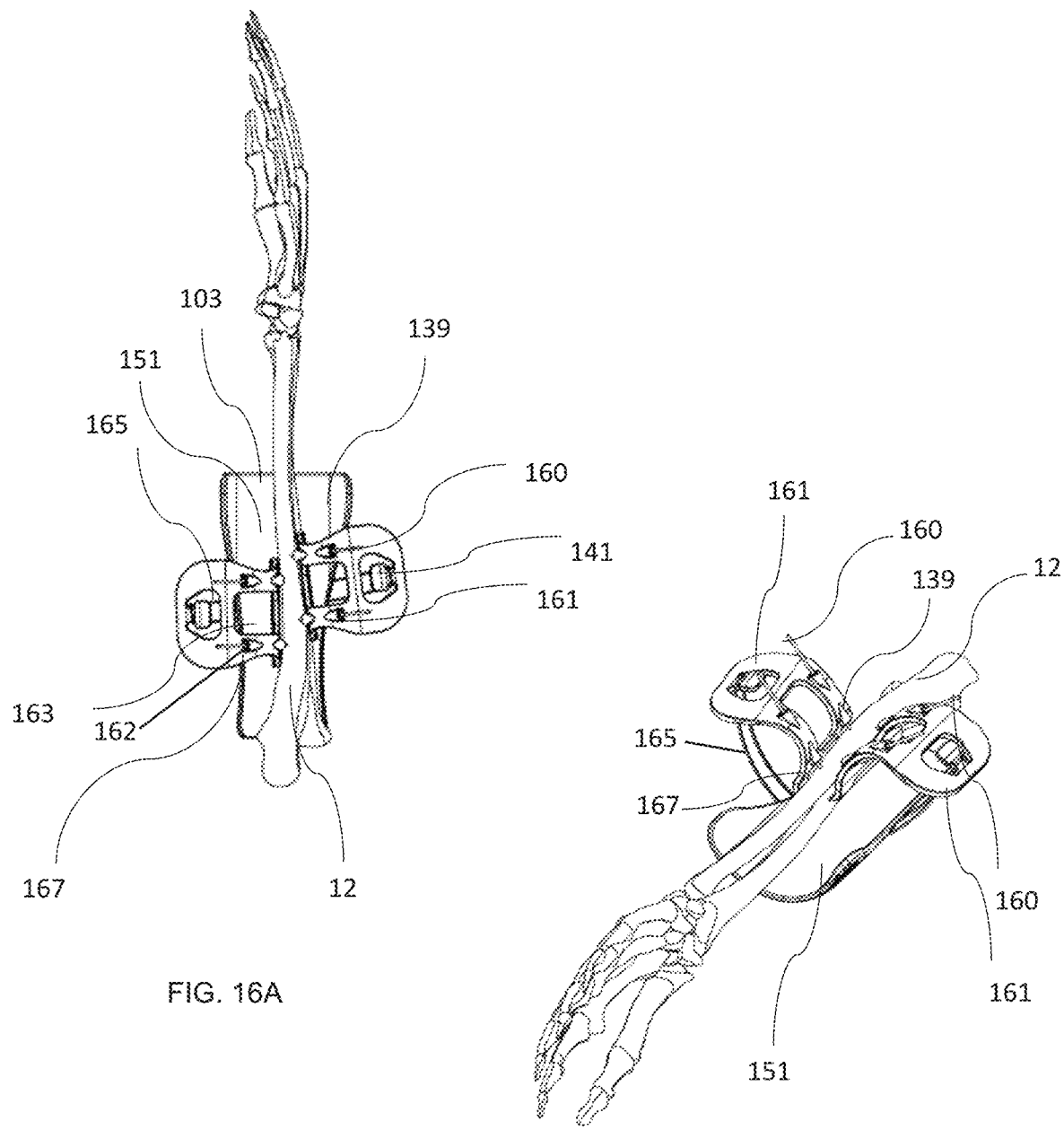
FIGS. 16A-16B illustrate a retraction and stabilization system for use on an ulna.

FIGS. 16A through 16B illustrate an embodiment of a retraction and stabilization system for use on a diaphyseal ulna fracture. The system may include any of the same or similar features and functions as any of the other systems described herein.

As shown in FIGS. 16A through 16B, each retractor 161, can include two guide structures 139. Each guide structure can have a lumen 162 configured to receive a pin (e.g., an attachment pin, a threaded pin, a non-threaded pin, a K-wire, or a metallic rod) or other metallic fixation device, such as a pin 160 for securing the retractor 161 to the ulna 12. Advantageously, having two guide structures 139 with two attachment pins (e.g., pins 160) can provide additional stability and can improve fixation to the ulna 12. The pins 160 and retractors 161 can help derotate and align the bone (e.g., to help with bone reduction). The retractors 161 and pins 160 can serve as a temporary fixation device during a surgical procedure.

As further shown, in FIGS. 16A through 16B, a tie 165 (e.g., an elastic tie, elastic band, etc.) may be looped around connectors 141 of each retractor 161. The elastic tie 165 may be looped around the back of the forearm and/or the backing plate 151 (See FIGS. 19A-C) and apply tension to pull the retractors 161 away from each other. Advantageously, by positioning the elastic tie 165 around the connectors 141 a user can have greater access to the ulna during a surgical procedure. For example, a surgeon can have the use of both hands during a surgical procedure when the elastic tie 165 applies the necessary force to keep the surgical area exposed.

In some embodiments, for example, as shown with respect to FIGS. 16A-16B, the retractors 161 are designed to be maintained within (e.g., not fall out of) the wound during a surgical procedure. In some embodiments, the retractors 161 are designed to be maintained within (e.g., not fall out of) the wound when the patient is in certain positions. For example, in some embodiments, the surgical procedure can be performed while the patient is in the supine position, the elbow joint is flexed up toward the patient's face. Such a position is not preferable for traditional retractors as they will not stay in position like the disclosed embodiments. The disclosed embodiments are capable of being stabilized such that they do not fall out of the patient in different surgical settings. For example, when multiple lumens 162 (e.g., two) are used to receive corresponding pins 160, and the pins 160 are anchored into the ulna 12, axial compression can be applied to the ulna. Alternatively, though not shown, in some embodiments, only a single lumen 162 may receive a pin 160 therethrough and the single pin 160 can be anchored into the bone. When only one lumen is used to receive a corresponding pin 160 anchored into the bone, a rotational lever arm may be provided. In such embodiments, the retractor 161 can provide rotational translation of the bone.

Figures 17A, 17B:
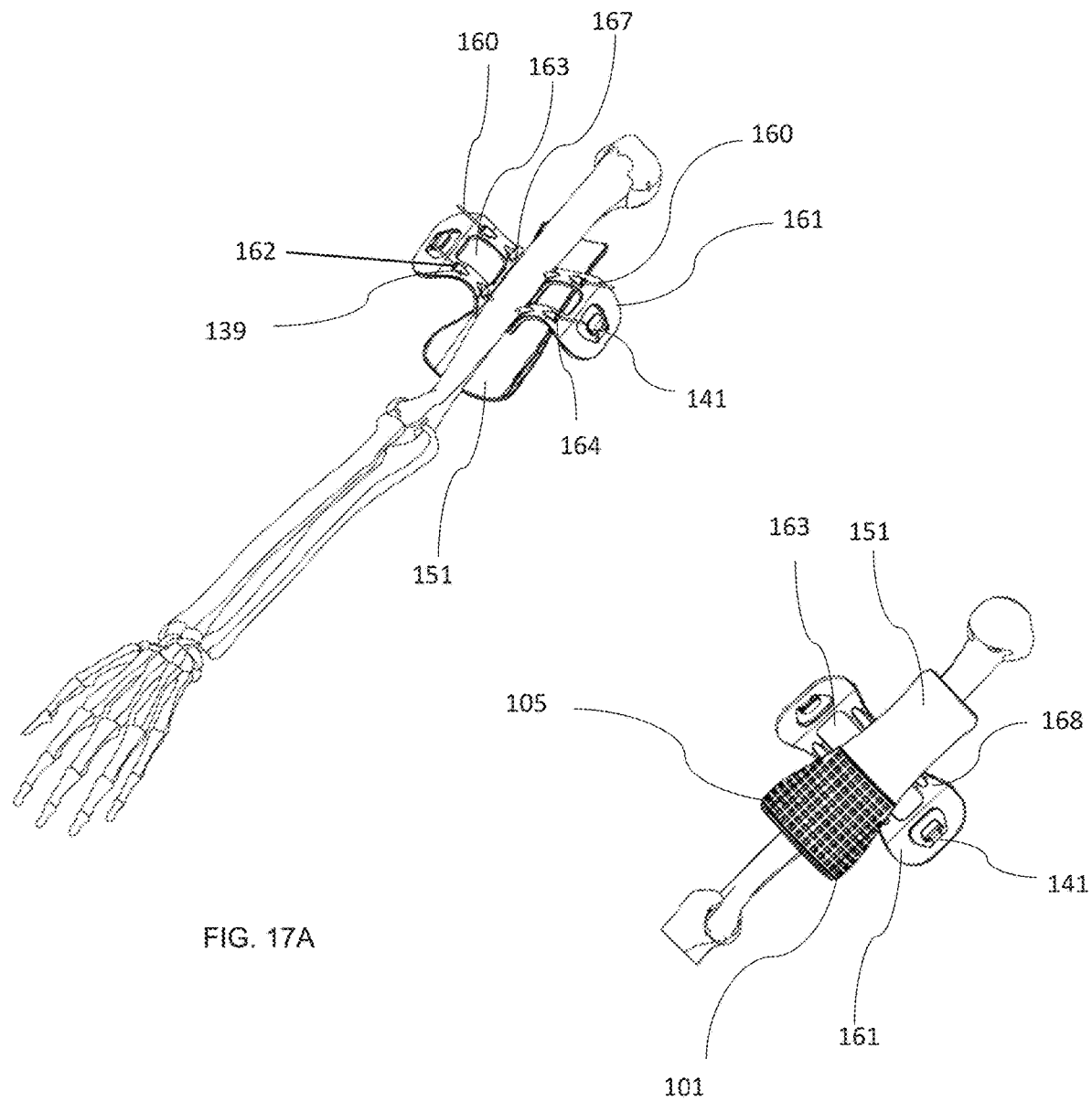
FIGS. 17A-17B illustrate a retraction and stabilization system for use on a humerus.

FIGS. 17A through 17B illustrate an embodiment of a retraction and stabilization system for use on a humerus fracture. The system may include any of the same or similar features and functions as any of the other systems described herein. In certain embodiments, the retractors can protect the radial nerve when applied on the lateral part of the arm. In alternative embodiments, a retractor may be used on the inner part of the arm to protect the ulnar nerve.

As shown in FIGS. 17A-17B, each retractor 161 can include two guide structures 139. Each guide structure 139 can have a lumen 162 configured to receive an attachment pin, such as a pin 160 for securing the retractor 161 to the humerus 14. The guide structure 139 can receive a first portion of the pins 160 (e.g., 25% of the pin 160) while the bone receives a second portion of the pin 160 (e.g., 25% of the pin) while the remaining portion of the pin 160 is exposed or extends out of the lumen 162 (e.g., 50%). Advantageously, having two guide structures 139 with two attachment pins (e.g., pin 160) can provide additional stability and can improve fixation to the humerus 14. The pin 160 and retractors 161 can help derotate and align the bone (e.g., to help with bone reduction). Additionally, the retractor 161 and pins 160 can hold the reduction of the humerus 14 in place until an implant is inserted. The retractors 161 and pins 160 can serve as a temporary fixation device during a surgical procedure. The retraction and stabilization may also include a backing plate 151.

In some embodiments, each retractor 161 (e.g., two retractors 161) can include a window 163 in a body 164 of the retractor 161 that may allow for positioning of the bone clamp to further help with the reduction (e.g., by providing additional stabilization). The window 163 can be sized and configured to allow a user to position a device through the window 163. For example, at least a portion of the bone clamp 155 can extend through the window 163 (e.g., the window 163 on each retractor 161). The windows 163 may enable access to the bone (e.g., the humerus) without impeding the retractor 161. In some embodiments, multiple clamps may be used with the retraction and stabilization system. The retractor 161 can have a bone engaging surface 167 (e.g., on or adjacent to the body 164) and a tissue engaging surface 168 on the opposite side of the retractor 161. The bone engaging surface 167 can be on a distal end of the retractor 161.

Figure 18A:
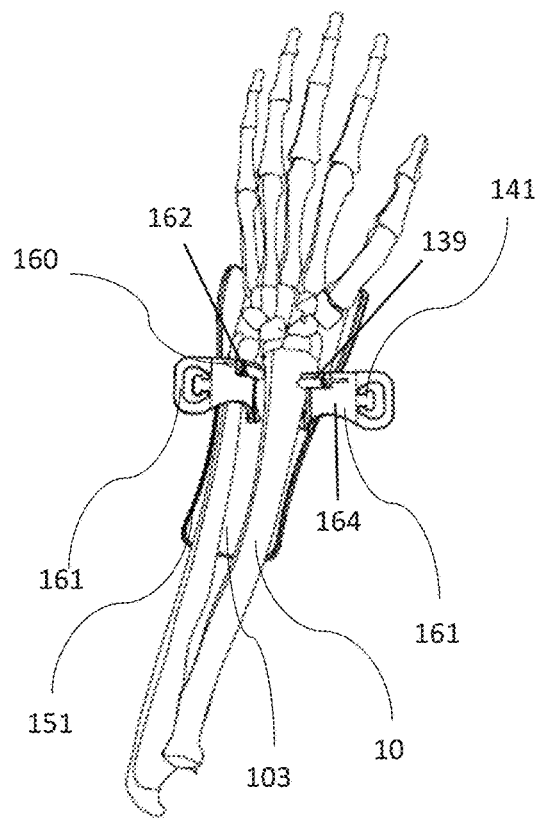
FIGS. 18A-18B illustrate a retraction and stabilization system for use in relation to the wrist.
Figure 18B:
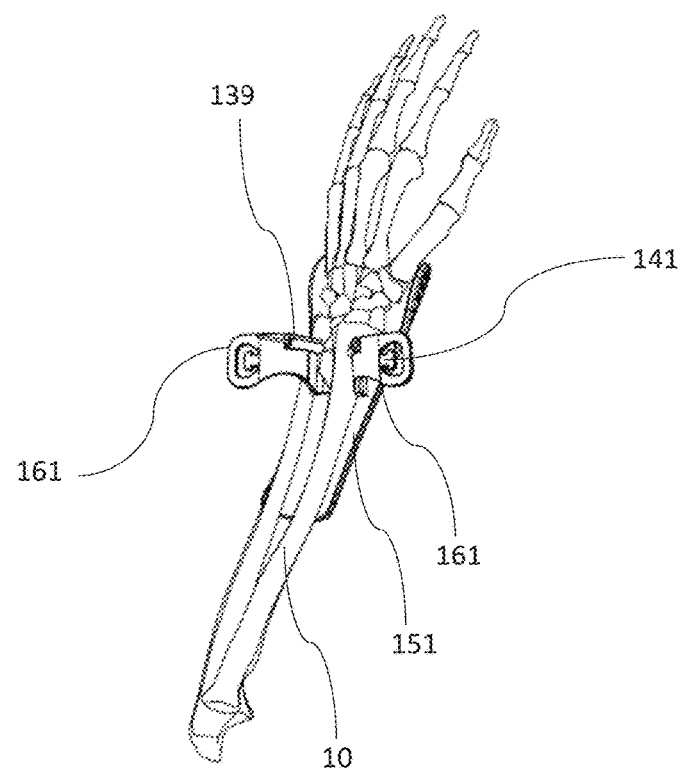

FIGS. 18A through 18B illustrate an embodiment of a retraction and stabilization system for use for a dorsal exposure to the carpal bones or dorsal approach to the distal radius with the metaphyseal retractors. The retraction and stabilization system may also have metaphyseal retractors for use on a metacarpal fracture. In some embodiments, the retractors of FIGS. 18A-18B may be used for the thumb metacarpal (not shown). In some embodiments, the system of FIGS. 18A-18B may be applied to a metatarsal fracture in the foot (not shown). The system may include any of the same or similar features and functions as any of the other systems described herein. Some embodiments allow for joint exposure or articular exposure of the wrist anatomy. For example, it may provide visualization of the wrist bones.

As shown in FIGS. 18A-18B, each retractor 161 can include a guide structure 139. The guide structure 139 can have a lumen 162 configured to receive a pin (e.g., an attachment pin, a threaded pin, a non-threaded pin, a K-wire, or a metallic rod) or other metallic fixation device, such as a pin 160 for securing the retractor 161 to the carpal bones 18. The guide structure 139 can receive a first portion of the pin 160 (e.g., 25% of the pin 160) while the bone receives a second portion of the pin 160 (e.g., 25% of the pin) while the remaining portion of the pin 160 is exposed or extends out of the lumen 162 (e.g., 50%).

While the embodiment of each retractor 161 shown in FIGS. 18A-18B includes a single guide structure 139, in other embodiments, each retractor 161 may include two guide structures 139. Advantageously, having two guide structures 139 with two attachment pins (e.g., pin 160) can provide additional stability and can improve fixation to the wrist. The pin 160 and retractors 161 can help derotate and align the bone (e.g., to help with bone reduction). Additionally, the retractor 161 and pins 160 can hold the reduction of the in place until an implant is inserted. The retractors 161 and pins 160 can serve as a temporary fixation device during a surgical procedure. The retraction and stabilization may also include a backing plate 151.

In some embodiments, each retractor 161 (e.g., two retractors 161) can include a window in a body 164 of the retractor 161 that may allow for positioning of the bone clamp to further help with the reduction (e.g., by providing additional stabilization). The window can be sized and configured to allow a user to position a device through the window. For example, at least a portion of the bone clamp 155 can extend through the window. The windows may enable access to the bone (e.g., radius 10) without impeding the retractor 161. In some embodiments, multiple clamps may be used with the retraction and stabilization system. The retractor 161 can have a bone engaging surface (e.g., on or adjacent to the body 164) and a tissue engaging surface on the opposite side of the retractor 161 as described herein. The bone engaging surface can be on a distal end of the retractor 161.

Figures 19A, 19B:
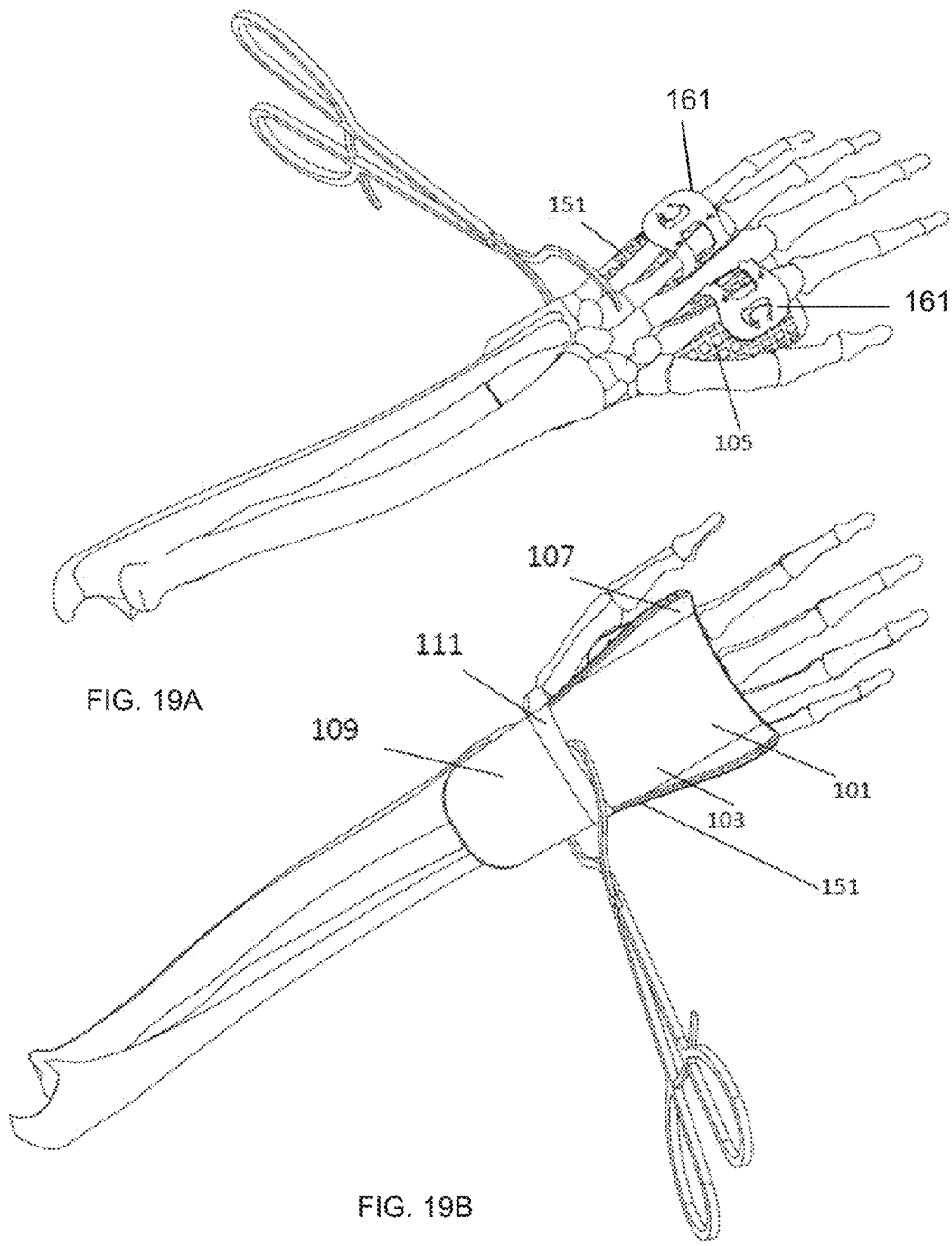
FIGS. 19A-19C illustrate a retraction and stabilization system for use on a metacarpal.
Figure 19C:
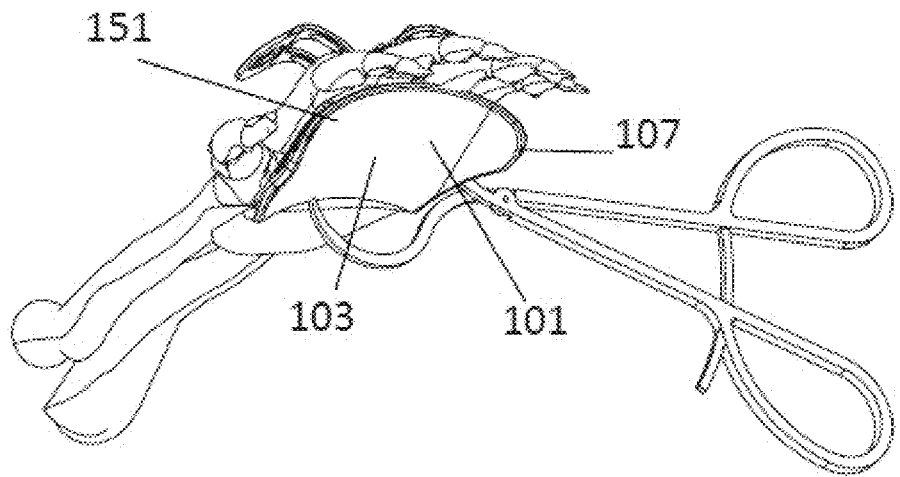
Figure 20:
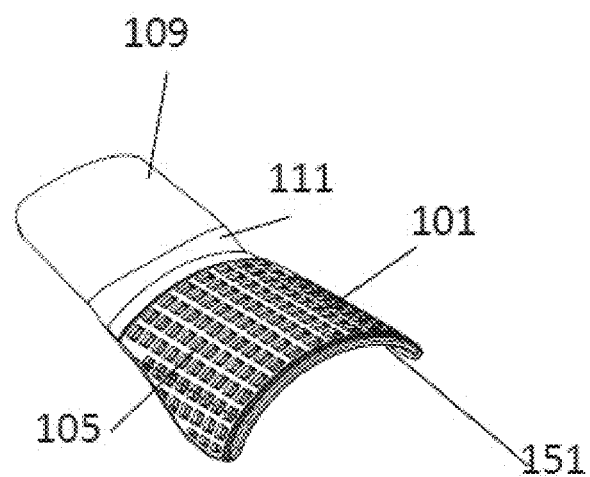
FIG. 20 illustrates a backing plate.

FIGS. 19A through 19C illustrate another embodiment of a metacarpal retraction and stabilization system. The system may include any of the same or similar features and functions as any of the other systems described herein. The metacarpal retraction and stabilization system includes backing plate 151. A perspective view of the backing plate 151 is shown in FIG. 20.

Various embodiments of the backing plates described herein can have different shapes and configurations to allow a closer anatomical match to and/or provide support to the patient's anatomy. For example, various embodiments of the backing plates described herein may have different lengths, widths, curvatures, etc., at different sections of the backing plate to support different regions of the patient's anatomy. For example, various embodiments of the backing plates described herein can be concave and convex surfaces that follow the natural anatomy of the patient.

As shown in FIGS. 19A-19C and 20, the backing plate 151 can be shaped, dimensioned, and/or otherwise configured to correspond to (e.g., match) the hand, wrist, and forearm of the patient. For example, the backing plate 151 can include a distal region 101. The distal region 101 can be configured to correspond to (e.g., match) the anatomy of the hand (e.g., the palm). The distal region 101 can include a convex side 103 and a concave side 105. The distal region 101 can further include wings 107. In some embodiments, the distal region 101 of the concave side 105 can have a grid-like surface (e.g., honeycomb, latticework, etc.). In some embodiments, the convex side 103 can be smooth. Advantageously, having a grid-like surface on the distal region 101 can increase flexibility of the backing plate 151.

In certain embodiments, the backing plate 151 can include a proximal region 109. The proximal region 109 can be configured to correspond to (e.g., match) the anatomy of the forearm. In some embodiments, the proximal region 109 can also be configured to correspond to (e.g., match) the anatomy of at least a portion of the wrist of the patient. The proximal region 109 can be generally flat or have less curvature than the distal region 101. The proximal region 109 can have a smooth surface. The wings 107 of the distal region 101 may extend laterally beyond the edges of the proximal region 109. In some embodiments, the wings 107 may extend partially beyond or entirely beyond the bones (e.g., metacarpal bones) of a user. The proximal region 109 can have a convex side 103 and a concave side 105.

In certain embodiments, the backing plate 151 can include a middle region 111 positioned between the proximal region 109 and the distal region 101. The middle region 111 can be configured to correspond to (e.g., match) the anatomy of the wrist. The middle region 111 may be flat or have less curvature than the distal region 101. In some embodiments, the middle region 111 can allow for a linear transition from the distal region 101 to the proximal region 109. Alternatively, the middle region 111 can allow for a curvilinear transition from the distal region 101 to the proximal region 109. The proximal region 109 can have a narrower width than the distal region 101.

In some embodiments, the backing plate 151 may be temporarily fixed to a patient's body after surgery, much like a split. The backing plate 151 can be applied in order to protect the wound and joint from being bumped or unintentionally moved which may result in damage to the surgical site. An elastic tie, such as elastic tie 165, can wrap around the backing plate 151 to secure the backing plate 151 to the patient's body when the elastic tie is attached to the tissue retractors 161 (e.g., via connectors, such as connectors 141).

Figure 21A:
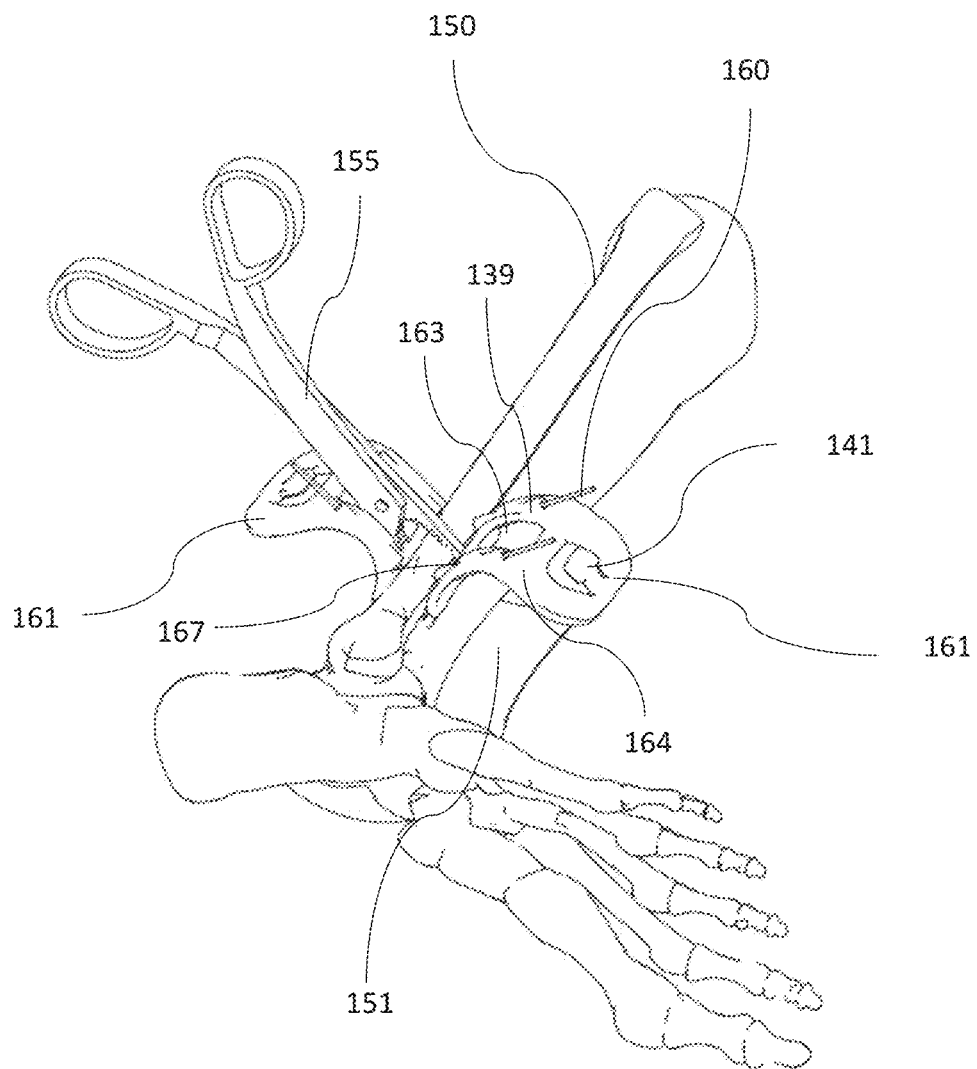
FIGS. 21A-21D illustrate a fibula retraction and stabilization system.
Figure 21B:
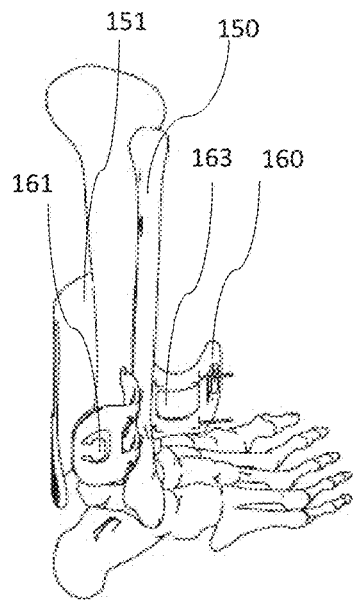
Figure 21C:
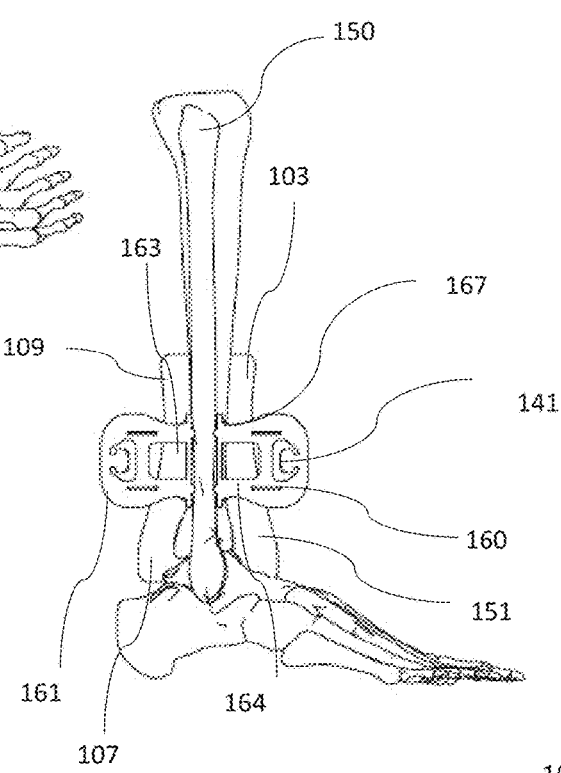
Figure 21D:
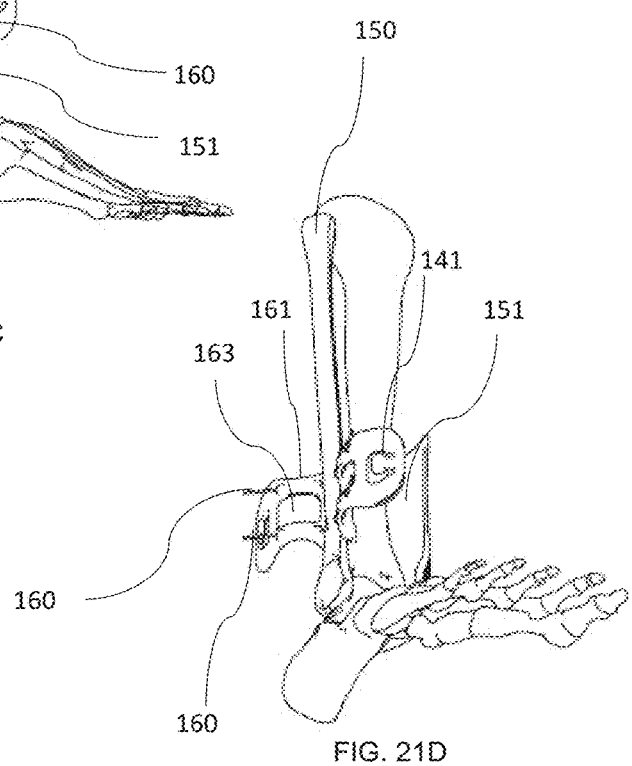

FIGS. 21A through 21D illustrate a fibula retraction and stabilization system. The system may include any of the same or similar features and functions as any of the other systems described herein. As shown in FIGS. 21A-21D, each retractor 161 can include two guide structures 139 having lumens configured to receive pins (e.g., an attachment pin, a threaded pin, a non-threaded pin, a K-wire, or a metallic rod) or other metallic fixation devices. As shown in FIG. 21A, a bone clamp 155 may also be used to further help with the reduction (e.g., by providing additional stabilization). In some embodiments, each retractor 161 can include a window 163 that may allow for positioning of the bone clamp 155 to further help with the reduction (e.g., by providing additional stabilization). For example, at least a portion of the bone clamp 155 can extend through the window 163.

As further shown in FIGS. 21A-21D, a tie (e.g., an elastic tie, elastic band, etc.), such as tie 165, may be looped around connectors 141 of each retractor 161. The elastic tie may be looped around the back of the fibula 150 and/or the backing plate 151 and apply tension to pull the retractors 161 away from each other. Advantageously, by positioning the elastic tie 165 around the connectors 141 a user can have greater access to the bone during a surgical procedure. For example, a surgeon can have the use of both hands during a surgical procedure when the elastic tie 165 applies the necessary force to keep the surgical area exposed.

Figures 22A, 22B:
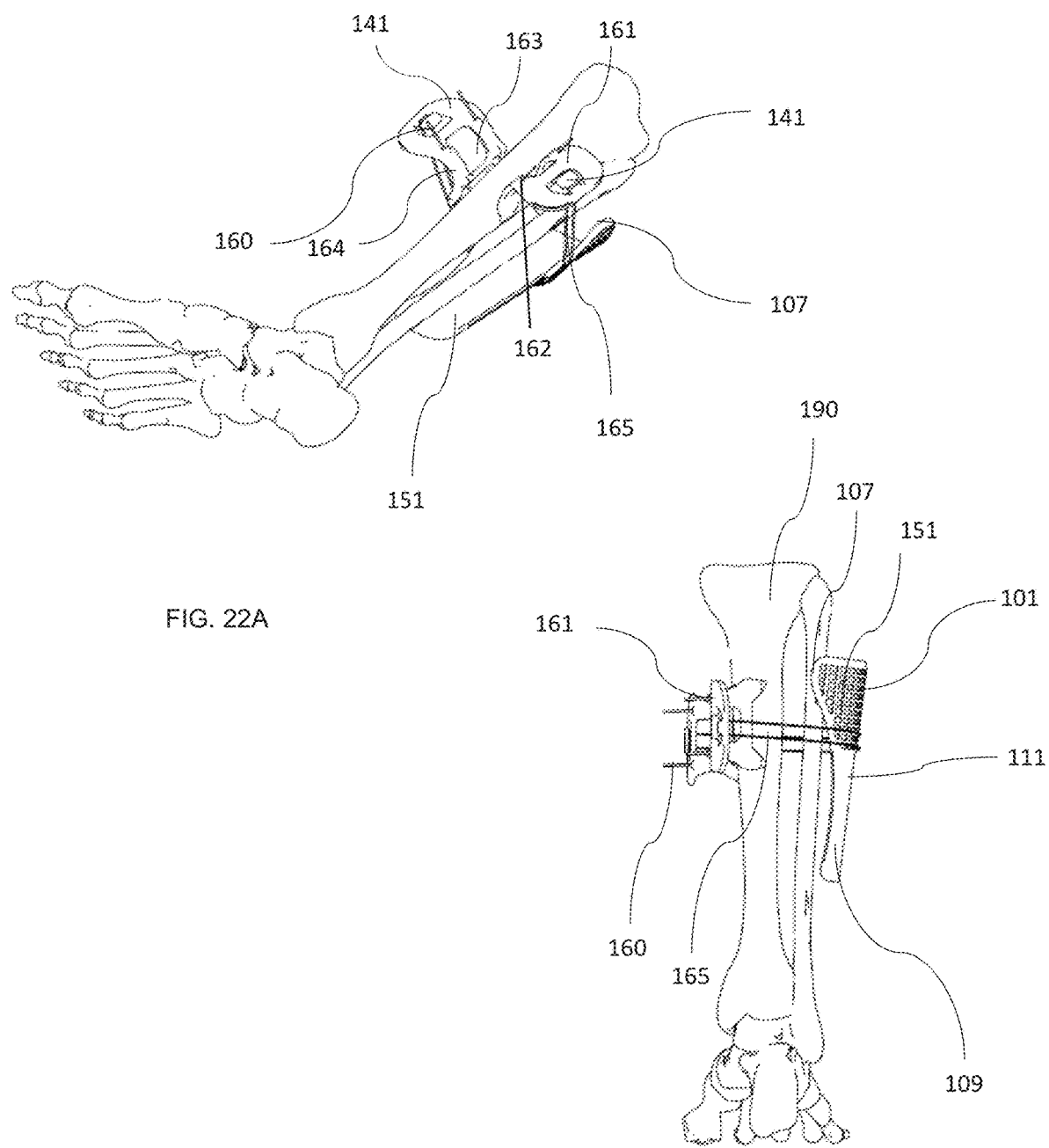
FIGS. 22A-22B illustrate a retraction and stabilization system for use on a tibia.

FIGS. 22A through 22B illustrate a retraction and stabilization system for use on tibial shaft fractures. The system may include any of the same or similar features and functions as any of the other systems described herein. In certain embodiments, the retractors may be used for the entire length of the tibia bone. FIGS. 22A-22B show the system positioned for treatment of a distal third fracture of the tibia. In some embodiments, metaphyseal retractors may also be used closer to the joint.

As shown in FIGS. 22A-22B, the retractor 161 (e.g., two retractors 161) can include two guide structures 139. Each guide structure 139 can have a lumen 162 configured to receive a pin (e.g., an attachment pin, a threaded pin, a non-threaded pin, a K-wire, or a metallic rod) or other metallic fixation device, such as a pin 160 for securing the retractor 161 to the tibia 190. The guide structure 139 can receive a first portion of the pins 160 (e.g., 25% of the pin 160) while the tibia receives a second portion of the pin 160 (e.g., 25% of the pin) while the remaining portion of the pin 160 is exposed or extends out of the lumen 162 (e.g., 50%). Advantageously, having two guide structures 139 with two attachment pins (e.g., pin 160) can provide additional stability and can improve fixation to the tibia. The pin 160 and retractors 161 can help derotate and align the bone (e.g., to help with bone reduction). Additionally, the retractor 161 and pins 160 can hold the reduction of the tibia in place for a desired period of time (e.g., until an implant is inserted). The retractors 161 and pins 160 can serve as a temporary fixation device during a surgical procedure.

FIGS. 23A through 23B illustrate an embodiment of a radial retractor 176.

Figure 24B:
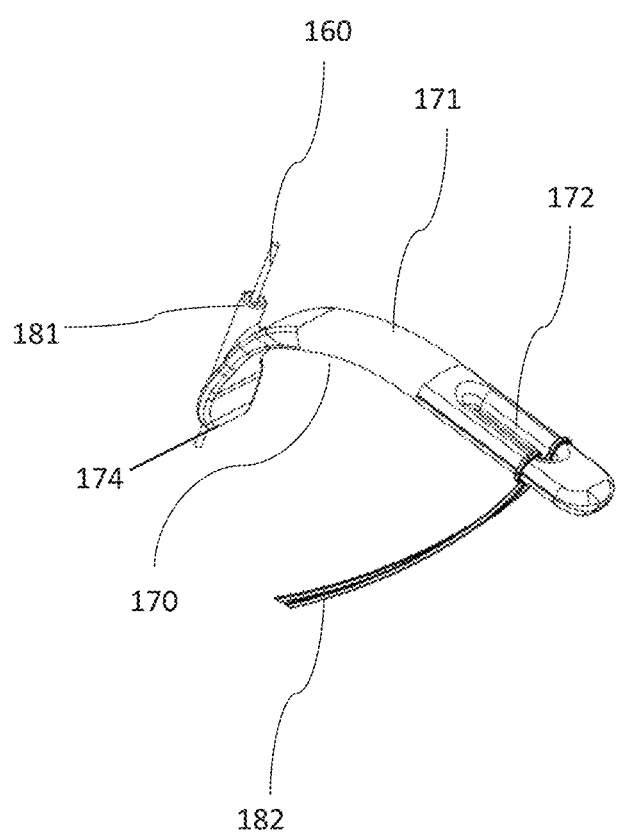
FIG. 24B illustrates a universal retractor with elastic bands.

FIGS. 24A-24B illustrate a universal retractor 170 (e.g., lunate retractor, universal pin-in-place retractor) that may be used at any anatomical location desired by a surgeon. The retractor 170 may include any of the same or similar features and functions as any of the other systems described herein. The universal retractor 170 features a handle 171 with a through hole or window 172 cut out in the handle. The window 172 can allow for one or more elastic bands to extend therethrough. The retractor 170 has a flat base 174 that can be secured with a pin (e.g., an attachment pin, a threaded pin, a non-threaded pin, a K-wire, or a metallic rod) or other metallic fixation device in nearly all anatomical locations on flat bones. The retractor 170 also has a distal end 175. An elastic band can be secured to the handle to allow the surgeon to control rotation of the retractors. In comparison, the prong 173 of the radial retractor 176 shown in FIGS. 23A-23B allows for rotational stability of the retractor.

As shown in FIGS. 24A-24B, a lumen 181 for placing a pin (e.g., an attachment pin, a threaded pin, a non-threaded pin, a K-wire, or a metallic rod) or other metallic fixation device within the retractor may have an axis 180 for fixation. This axis 180 may not have rotational or other constraints. The lumen 181 may extend through a guide structure 179.

As further shown in FIG. 24B, one or more elastic bands 182 may be used to further stabilize the retractor. For example, one or more elastic bands 182 can be placed through the window 172. The bands 182 can be placed a deliberate distance from the pin in order to stabilize the retractor 170 in the rotational and axial directions. In some embodiments, the retractor handle 171 can be based on the desired clinical benefit or use case (e.g., the length of the handle can be long or short to meet clinical requirements). The length of the retractor 170 may vary to provide longer or shorter lever arms depending on the desired clinical benefit or use case.

In certain embodiments, one or more universal retractors 170 may be used as drill guides, for example, as described with respect to FIGS. 8A-8B. The universal retractor 170 may be radiolucent for use as a radiolucent drill guide. In certain embodiments, a universal retractor 170 may be used in a procedure including one or more of the following steps: removing the retractor 170 from a pouch, establishing surgical access to a fracture site, drilling a pin at a desired angle using the universal retractor as a drill guide with the pin through the lumen 181 and the distal end 175 in a desired position against the bone, and ensuring the pin is distal to the lumen 181.

Figure 25:
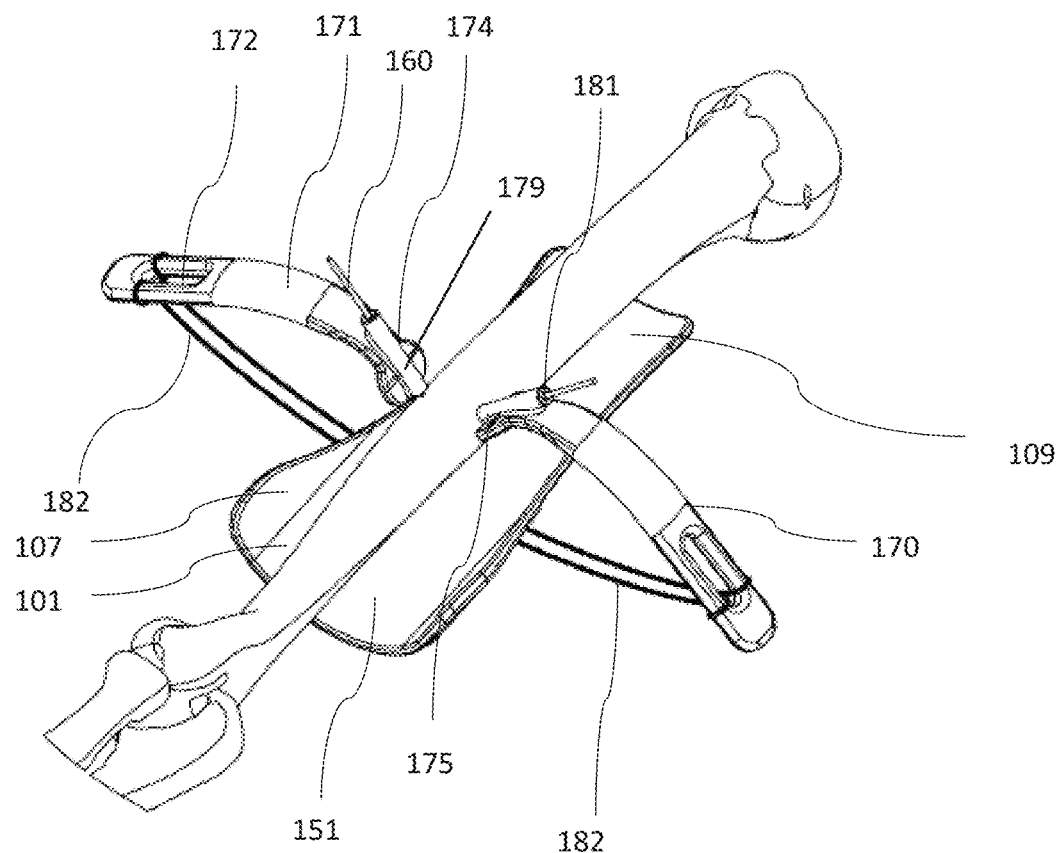
FIG. 25 illustrates a retraction and stabilization system including universal retractors.

FIG. 25 illustrates a retraction and stabilization system including one or more retractors 170 (e.g., two retractors 170). A lumen 181 for placing a pin within the retractor may have an axis 180 for fixation. This axis may not have rotational or other constraints. The pins 160 and retractors 170 can help derotate and align the bone (e.g., to help with bone reduction). Additionally, the retractor 170 and pins 160 can hold the reduction of the bone in place for a desired period of time (e.g., until an implant is inserted). The retractors 170 and pins 160 can serve as a temporary fixation device during a surgical procedure. One or more elastic bands 182 (e.g., an elastic tie, elastic band, etc.) may be looped around window 172 of each retractor 170. The elastic bands 182 may be looped around the back of the backing plate 151. The axis 180 of the lumen 181 may be at least about 45° and preferably between about 80 and 110° from the longitudinal axis of the handle 171. This facilitates grasping the handle 171 and pressing the distal end 175 against the bone when used as a drill guide, or for fixation and retraction.

Procedure steps in an exemplary procedure are described below. Not all steps are necessary in a particular procedure, multiple images may be obtained depending on the nature of the fracture(s), and the order of performance of some of the steps can be varied as will be understood by those of skill in the art.

Take the Backing Plate out of the pouch.

Place Backing Plate on the patient's forearm.

Establish surgical access to the radius.

Take one of the Ulnar side retractors out of the pouch.

Drill the pin (e.g., an attachment pin, a threaded pin, a non-threaded pin, a K-wire, or a metallic rod) or other metallic fixation device at the desired angle using the handheld radiolucent drill guide.

Slide Ulnar side retractor passing the pin through the guide lumen into desired position. Ensure the tip is distal to the guide lumen. Alternatively, insert the ulnar side retractor first, securing the distal tip under the bone. Then insert the pin into the lumen and drill into the bone.

Take the Radial side retractor out of the pouch.

Drill the pin at the desired angle using the handheld radiolucent drill guide.

Slide Radial side retractor passing the pin through the guide lumen into desired position. Ensure the tip is distal to the guide lumen.

Secure both Ulnar, Radial, and Backing plate with rubber bands.

If more visualization of the lunate region is needed, use the retractor end of the handheld radiolucent drill guide as a retraction mechanism.

Place implant plate on the space between the two Ulnar fixed parts over the radius Check where plate was placed relative to the fixed device parts.

Once implant plate is positioned, put some acumen pin (2 pins placed, using the handheld radiolucent drill guide), to hold the plate in position.

Clamp backing plate to the bone.

Place another pin (Trajectory pin).

Take imaging shot (Xray with contrast) to judge plate's position with respect to radial bone. Verify bone fragments are correctly positioned to ensure proper range of motion for the patient once healed.

Move the setup until obtaining a proper shot by grabbing onto the clamp.

Drive trajectory pin forward/backwards or change trajectory as needed.

Reposition the clamp accordingly to get a better view.

Repeat the shot as needed.

Remove pins.

Remove rubber bands.

Remove Ulnar and Radial parts.

Remove Backing plate.

Standard surgical closure.

Additional details of a variety of system components are illustrated in the attached Figures, with structural details of specific examples identified in the table below and associated with call out numbers in the drawings. All recited dimensions are related to specific embodiments, but any such recited dimension may be varied by +/−25% or +/−15% or other scaling depending upon the desired application and performance as will be understood by those of skill in the art. Method steps are also described below the feature table, below.

| ID | Feature | Description | Specification range |
| --- | --- | --- | --- |
| 1 | Wrist Backing plate | Base Curvature | Curvature that matches the contour of the forearm to allow for arm resting on the plate. | Defined by four arc segments with radii 34, 44, 30, and 40 mm. |
| 2 | | Side Cuts | Two symmetric side cuts for matching forearm shape and ensuring good support and contact. Cuts are symmetric for device to be used for both left and right arms. | Hourglass shaped Width of the plate at proximal end: 54.52 mm. Width of the plate at distal end: 78.8 mm. Width of the plate at neck: 57.6 mm. Cut: 40 mm width at proximal end 17.43 mm width at distal end |
| 3 | | Distal wings | Optimized degree of radial/ulnar coverage. | 144° of coverage (wing-to-wing) in one implementation; generally within the range of from about 90 to 180 degrees |
| 4 | | Length | Optimal length to provide good structural support of forearm. | 160 mm. |
| 5 | | Fillet | Fillet corners to smooth the edges No sharp surfaces to irritate patient skin or represent sharp points for gloves. | Radius of 10 mm at distal, 8 mm at proximal end, and 1 mm throughout. |
| 6 | | Grid pattern | Covering the distal end, to improve the grip and allow for tunable clamp placement. | Rectangular pattern with 1 mm depth and contoured pockets; grid size may be from about 0.5 to about 2.0 mm |
| 7 | | Thickness | Optimal thickness to decrease bulkiness while ensuring stiffness and strength | At proximal end: 3 mm At distal end: 4 mm; both generally within the range of from about 1 mm-4 mm |
| 8 | | Material | Nylon 12 could ultimately have composite reinforcement | Tensile Modulus: 0 MPa Tensile Strength: 48 MPa Flexural/Bending Modulus (23° C.): 1,500 MPa |
| 9 | | Scale | Scaled to 0.8 on x and y axes for small size | Scaling factor: 0.8 |
| 10 | Ulnar Plate (Left & Right) | Base Profile | Curved handle extending laterally away from the incision site so surgeon's view is un-obstructed. Length extended beyond wrist to create appropriate vector for elastic restraints | Defined by two 60° arcs with radii 25 mm and 28.3 mm, respectively. 20 mm long rectangular tail and 0.8 mm thick pointy end. |
| 11 | | Tip | Tip created by a cut at the distal end. For better attachment of the plate within the bony structures. Offset from centerline of plate for torsional adjustments Geometry provides leverage | Width: 15.78 mm Height: 11.5 mm Fillet of 1.75 mm radius. |
| 12 | | Rib | Cylindrical Rib structure appended on opposite side of the tip, with an inner hole for pin placement to secure the plates by | Rib diameter: 6 mm Inner hole diameter: 2.2 mm Rib Length: 25 mm Chamfer: 0.5 mm distance and 45° |

-continued

| ID | Feature | Description | Specification range |
|---|---|---|---|
| | | drilling into the bone. Offset from centerline to aid in placement and rotation | |
| 13 | Rounded corners at proximal end | To improve flexibility, reduce bulkiness and smooth the edges. | 9 mm radius. |
| 14 | Center cut | To improve flexibility when surgeon handles and fixates the plate at different positions. Narrow neck to reduce the impact to incision length | 23.05 mm radius 35 mm cut length Fillets of 6 and 8 mm of radius at edges of center cut. |
| 15 | Thickness | Not too thick to avoid bulkiness nor too thin so that it is too fragile | 3.3 mm in one implementation; generally within the range of from about 1-4 mm |
| 16 | Hook | Located at the proximal end. To enable elastic band attachment. | 12 mm wide, 8.6 mm long hook over 18.9 mm wide, 13.6 mm long gap. Radius of Hook arcs: 2.5 mm and 1.5 mm |
| 17 | Material | Nylon 12 could ultimately have composite reinforcement | Tensile Modulus: 1620 MPa Tensile Strength: 48 MPa Flexural/Bending Modulus (23° C.): 1,500 MPa |
| 18 | Lunate Retractor/ Drill Guide Tip | Curved shape and flat end for optimal tissue contact without impingement risk | Two 60° arcs with radii 32 mm and 25 mm. Variable thickness: from 3.25 to 5.25 mm. Two 7.5- and 10-mm radii arcs at the distal end of the tip. |
| 19 | Cut-out | Cut-outs on sides of tip to confer hourglass shape | Cut-outs of 10.25- and 15-mm radii along length of tip. Width at proximal end: 16 mm Width at distal end: 14.49 mm |
| 20 | Fillet | Fillet corners to smooth the edges No sharp surfaces to irritate patient skin or represent sharp points for gloves. | 3 of radius surrounding entire part |
| 21 | Loft | Neck of the handle | Rectangular to oval shape. Loft constraint by two 40- and 70-mm radii arcs. |
| 22 | Rib | Rib cylindrical structure appended on same side of the retraction end, with an inner hole for pin placement to secure the plates by drilling into the bone. | Rib radius: 3.25 mm cylindrical rib of length 32.5 mm Inner hole radius: 1.10 mm Chamfer: 0.5 mm distance and 45° |
| 23 | Extrusion | Extrusion to increase the length of the retractor end | Length 52 mm in one implementation; generally from about 40-80 mm |
| 24 | Handle | Hole left that acts as handle for improved grip and potential interface with elastic restraints | 25-mm long, 6.5-mm wide cut with the shape of a slot in one implementation; length generally from about 20-50 mm |

-continued

| ID | Feature | Description | Specification range |
|---|---|---|---|
| 25 | Fillet | Fillets along the rib for smoothing purposes. No sharp surfaces to irritate patient skin or represent sharp points for gloves. | 0.5-mm fillets at chamfer 1 mm fillet along length of the rib |
| 26 | Fillet | Fillets at the distal end and handle for smoothing purposes. No sharp surfaces to irritate patient skin or represent sharp points for gloves. | Radius 1 mm along tip width. Radius 2 mm along handle |
| 27 | Duality | Dual device useful for both tissue retraction and as a drill guide for pin insertion | |
| 28 Ankle Backing Plate | Base Curvature | Curvature that matches the contour of the _ to allow for _ resting on the plate. | Defined by four arc segments with radii 50, 54, 37.5, and 41.5 mm. |
| 29 | Side Cuts | Two symmetric side cuts for matching _ shape and ensuring good support and contact. Cuts are symmetric for device to be used for both left and right legs. | Hourglass shaped Width of the plate at proximal end: 54.05 mm. Width of the plate at distal end: 78.89 mm. Width of the plate at neck: 50 mm. Cut: 40 mm width at proximal end 17.3 mm width at distal end |
| 30 | Distal wings | Optimized degree of tibial coverage. | 144° of coverage (wing-to-wing) |
| 31 | Length | Optimal length to provide good structural support of _. | 160 mm. |
| 32 | Fillet | Fillet corners to smooth the edges No sharp surfaces to irritate patient skin or represent sharp points for gloves. | Radius of 10 mm at distal, 8 mm at proximal end, and 1 mm throughout. |
| 33 | Grid pattern | Covering the _end, to improve the grip and allow for tunable clamp placement. | Rectangular pattern with 1 mm depth and contoured pockets |
| 34 | Thickness | Optimal thickness to decrease bulkiness while ensuring stiffness and strength | At proximal end: 3 mm At distal end: 4 mm |
| 35 | Material | Nylon 12 could ultimately have composite reinforcement | Tensile Modulus: 1620 MPa Tensile Strength: 48 MPa Flexural/Bending Modulus (23° C.): 1,500 MPa |
| 36 Ankle side retractor | Base Profile | Curved handle extending laterally away from the incision site so surgeon's view is un-obstructed. Length extended beyond ankle to create appropriate vector for elastic restraints | Defined by two 60° arcs with radii 25 mm and 28.3 mm, respectively. 20 mm long rectangular tail and 0.8 mm thick pointy end. |
| 37 | Tips | Two tips created, mirror images of each other, by a cut at the distal end. For better attachment of the plate within the bony structures. Geometry provides leverage | Width: 15.78 mm Height: 11.5 mm Fillet of 1.75 mm radius. |

-continued

| ID | Feature | Description | Specification range |
|---|---|---|---|
| 38 | Rounded corners at proximal end | To improve flexibility, reduce bulkiness and smooth the edges. | 9 mm radius. |
| 39 | Side Relieves | Two center cuts on each side. To improve flexibility when surgeon handles and fixates the plate at different positions. Narrow neck to reduce the impact to incision length | 22.5 mm radius 35 mm cut length Fillets of 5 mm of radius at edges of center cut |
| 40 | Thickness | Not too thick to avoid bulkiness nor too thin so that it is too fragile | 3.3 mm |
| 41 | Hook | Located at the proximal end. To enable elastic band attachment. Slightly bend outwards to aid in rubber band placement. | Tilted 25.5° outward. 16 mm wide, 15.2 mm long hook over 22 mm wide, 20 mm long gap. Radius of Hook arcs: 4 mm and 1 mm |
| 42 | Material | Nylon 12 could ultimately have composite reinforcement | Tensile Modulus: 1620 MPa Tensile Strength: 48 MPa Flexural/Bending Modulus (23° C.): 1,500 MPa |
| 43 System | Tightening mechanism | Grid pattern improving grip for clamping at different locations. | |
| 44 | Compatibility | pins and clamps | |
| 45 | Adjustability after anchoring | Variable tensioning with elastic bands to easily adjust positions | |
| 46 Clinical | Position verification | Device made of Nylon which is radiolucent, position can be verified during fluoroscopy imaging. | |
| 47 | Variants of location | Different scales for different patient sizes. | |
| 48 | Radiolucency | Materials transparent to X-rays | |
| 49 | Hands free | Self-retaining mechanism via elastic bands and clamp placement | |
| 50 | Permanent thru procedure | Self-retaining mechanism via elastic bands and clamp placement | |

What is claimed is:

1. A soft tissue retraction system, comprising:
a soft tissue retractor, comprising:
  a support body;
  a bone engaging concavity on a first side of the support body;
  a soft tissue retracting surface on a second side of the support body;
  a first guide configured to receive a first pin to anchor the first pin into a bone when the bone is positioned within the bone engaging concavity; and
  a second guide configured to receive a second pin to anchor the second pin into the bone when the bone is positioned within the bone engaging concavity.

2. The system of claim 1, wherein the soft tissue retraction system is configured to apply axial compression when the first pin is received within the first guide and anchored into the bone and the second pin is received within the second guide and anchored into the bone.

3. The system of claim 1, wherein the soft tissue retraction system is configured to provide rotational translation when only one of the first pin and the second pin is received within its respective guide and anchored into bone.

4. The system of claim 1, wherein the bone is an ulna, a humerus, a metacarpal, a metatarsal, a fibula, a tibia, a femur, or a clavicle.

5. The system of claim 1, wherein the first guide comprises a first lumen and the second guide comprises a second lumen, wherein the first pin extends through the first lumen and the second pin extends through the second lumen to anchor to the bone.

6. The system of claim 1, wherein the soft tissue retractor is configured to hold a reduction of the bone in place.

7. The system of claim 1, further comprising a window configured to receive a bone clamp when the bone is positioned within the bone engaging concavity.

8. The system of claim 1, further comprising a backing plate.

9. The system of claim 8, wherein the backing plate has a concave side configured to conform to an anatomy of a user, wherein the backing plate has a convex side opposite the concave side.

10. The system of claim 9, wherein the backing plate comprises a curved distal region comprising a concave side and a convex side and a proximal region having a different curvature than the distal region.

11. The system of claim 10, wherein the curved distal region is configured to support a palm and the proximal region is configured to support a forearm.

12. The system of claim 11, wherein the backing plate comprises a middle region connecting the proximal region and the curved distal region, wherein the middle region is configured to support a wrist.

13. The system of claim 1, further comprising a tie configured to couple to the soft tissue retractor.

14. The system of claim 13, wherein the soft tissue retractor is a first soft tissue retractor, wherein the system further comprises a second soft tissue retractor including a second bone engaging concavity configured to engage the bone, wherein the tie is configured to couple to the second soft tissue retractor to connect the first and second soft tissue retractors.

15. The system of claim 14, wherein the tie is configured to apply tension to pull a proximal end of the first soft tissue retractor and a proximal end of the second soft tissue retractor away from each other to retract opposing sides of an incision.

16. The system of claim 14, wherein the tie is an elastic tie.

* * * * *